United States Patent
Tokunaga et al.

(10) Patent No.: US 6,870,880 B2
(45) Date of Patent: Mar. 22, 2005

(54) WAVEFORM EQUALIZATION APPARATUS

(75) Inventors: Naoya Tokunaga, Osaka (JP); Kazuya Ueda, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 585 days.

(21) Appl. No.: 10/081,718

(22) Filed: Feb. 25, 2002

(65) Prior Publication Data

US 2002/0118741 A1 Aug. 29, 2002

(30) Foreign Application Priority Data

Feb. 23, 2001 (JP) ........................................ 2001-047824

(51) Int. Cl.⁷ ................................................. H03H 7/30
(52) U.S. Cl. ..................................... 375/229; 375/230
(58) Field of Search ................................ 375/229, 230, 375/235; 708/322, 323; 333/28 R

(56) References Cited

U.S. PATENT DOCUMENTS

| | | | |
|---|---|---|---|
| 5,285,475 A | * | 2/1994 | Kurokami .................. 375/233 |
| 5,321,723 A | * | 6/1994 | Mizoguchi .................. 375/233 |
| 5,388,062 A | | 2/1995 | Knutson .................. 364/724.2 |
| 6,154,505 A | | 11/2000 | Konishi et al. ............. 375/321 |
| 2001/0026578 A1 | * | 10/2001 | Ando ......................... 375/130 |

FOREIGN PATENT DOCUMENTS

| | | |
|---|---|---|
| JP | 06-334481 | 12/1994 |
| JP | 10-290266 | 10/1998 |

* cited by examiner

*Primary Examiner*—Khai Tran
(74) *Attorney, Agent, or Firm*—Parkhurst & Wendel, L.L.P.

(57) ABSTRACT

A waveform equalization apparatus is provided with plural TF (transversal filter) units and plural selectors, and the TF units are connected such that the construction of the whole filter becomes a real component filter when an input signal is a VSB signal while it becomes a complex filter when the input signal is a QAM signal, by switching the inputs of each selector. The waveform equalization apparatus so constructed can waveform-equalize both the VSB signal and the QAM signal, and the circuit scale of the apparatus is reduced.

15 Claims, 15 Drawing Sheets

WAVEFORM EQUALIZATION APPARATUS

FIELD OF THE INVENTION

The present invention relates to a waveform equalization apparatus for reducing transmission line distortion of a digital signal which is used for digital broadcasting.

BACKGROUND OF THE INVENTION

Although digital broadcasting has initially been carried out mainly in satellite broadcasting, a tide of digitization recently rushes into terrestrial broadcasting and cable broadcasting. A waveform equalization technique for reducing transmission line distortion is indispensable for terrestrial digital broadcasting and cable digital broadcasting.

Hereinafter, a conventional waveform equalization apparatus for terrestrial digital broadcasting will be described taking, as an example, a DTV (Digital Television) system using an 8-VSB (8-level Vestigial Side Band) modulation method that is adopted in the United States.

FIG. 11 is a block diagram illustrating a conventional waveform equalization apparatus adapted to the VSB modulation method. In FIG. 11, the waveform equalization apparatus is provided with a data input terminal 1001 to which a DTV signal S1 employing the VSB modulation method (hereinafter referred to as a VSB signal) is applied; a digital filter unit 1015 for performing a filtering process, for waveform equalization on the VSB signal inputted from the data input terminal 1001; a data output terminal 1011 for outputting the VSB signal S2 which has been subjected to the waveform equalization filtering process by the digital filter unit 1015; and a tap coefficient control unit 1014 for calculating tap coefficients to be used in the digital filter unit 1015 on the basis of the data obtained from the digital filter unit 1015, and outputting the tap coefficients to the digital filter unit 1015.

In the digital filter unit 1015, a 32-tap transversal filter (hereinafter referred to as a TF) 1002 receives the signal S1 applied to the data input terminal 1001, and calculates a product of a signal obtained from each of the internal 32 taps and the corresponding tap coefficient which is given by the tap coefficient control unit 1014, and outputs the sum of products so calculated, as a signal obtained by a filtering process for waveform equalization, to an adder 1009 and, further, outputs a delay signal which is obtained by delaying the input signal, to the 32-tap TF 1003 and the adder 1009. The TF 1003 receives the delay signal outputted from the TF 1002, calculates a product of a signal obtained from each of the internal 32 taps and the corresponding tap coefficient which is given by the tap coefficient control unit 1014, and outputs the sum of products so calculated, as a signal obtained by a filtering process for waveform equalization, to the adder 1009. The TF 1002 and the TF 1003 are used as an equivalent to a 64-tap TF, and the delay signal outputted from the TF 1002 to the adder 1009 is regarded as a signal from a center tap of the 64-tap TF constituted by the TF 1002 and the TF 1003, i.e., a main signal component. A delay unit 1004 delays the signal outputted from the adder 1009 by 32 symbols, and outputs the delayed signal to a delay unit 1010 and a slicer 1005. The slicer 1005 maps the output signal from the delay unit 1004 to a closest value among the eight values the VSB signal can take, thereby removing an influence of noise of the input signal on the subsequent processes. A 64-tap TF 1006 receives the signal outputted from the slicer 1005, calculates a product of a signal obtained from each internal tap and the corresponding tap coefficient given by the tap coefficient control unit 1014, and outputs the sum of products so calculated, as a signal obtained by a filtering process for waveform equalization, to the adder 1009, and further, outputs a delay signal which is, obtained by delaying the input signal to a 64-tap TF 1007. The 64-tap TF 1007 receives the signal outputted from the TF 1006, calculates a product of a signal obtained from each internal tap and the corresponding tap coefficient given by the tap coefficient control unit 1014, and outputs the sum of products so calculated, as a signal obtained by a filtering process for waveform equalization, to the adder 1009, and further, outputs a signal which is obtained by delaying the input signal to a 64-tap TF 1008. The 64-tap TF 1008 receives the signal outputted from the TF 1007, calculates a product of a signal obtained from each of the internal 64 taps and the corresponding tap coefficient given by tap coefficient control unit 1014, and outputs the sum of products so calculated, as a signal obtained by a filtering process for waveform equalization, to the adder 1009. The three TFs 1006, 1007, and 1008, which are connected in series, are used instead of a 192-tap TF. The delay unit 1010 delays the signal obtained from the delay unit 1004 by 192 symbols (=64 symbols×3), i.e., by symbols to be delayed by the TF 1006, TF 1007, and TF 1008, and outputs the delayed signal to the tap coefficient control unit 1014. The adder 1009 adds the results of the product-sum operations which are respectively obtained from the TF 1002, TF 1003, TF 1006, TF 1007, and TF 1008 (i.e., signals obtained by the waveform equalization filtering processes of the respective TFs), and outputs a signal obtained by the addition, as a waveform-equalized VSB signal S2, from the data output terminal 1011 and, further, outputs the signal obtained by the addition, to the tap coefficient control unit 1014 and the delay unit 1004. Tho tap coefficient control unit 1014 calculates the tap coefficients corresponding to the respective taps included in the TF 1002, TF 1003, TF 1006, TF 1007, and TF 1008, on the basis of the outputs from the adder 1009 and the delay unit 1010, and outputs the tap coefficients to the TF 1002, TF 1003, TF 1006, TF 1007, and TF 1008, thereby controlling updation of the tap coefficients.

FIG. 12 is a diagram illustrating the structure of a VSB system signal format. The VSB system signal format comprises an area including a data signal 3101 such as video and audio data, an area including a field sync signal 3102, and an area including a segment sync signal 3103.

FIG. 13 is a schematic diagram illustrating the structure of the field sync signal. With reference to FIG. 13, the field sync signal in the area 3102 includes a PN 511 signal 3201, three PN 63 signals 3202, and a control signal 3203. In FIG. 12, a field sync signal #2 is different from a field sync signal #1 only in that the second value of the PN 63 signal 3202 is inverted. Further, in FIG. 13, numeric values on the left side, i.e., +7, +5, +3, +1, −1, −3, −5, and −7, are examples of eight values the 8-VSB modulation method can take.

The VSB signal comprises 832 symbols and 313 segments per frame. Further, the PN 511 signal 3201 is represented by $PN511 = X^9 + X^7 + X^6 + X^4 + X^3 | X | 1$, and Pre-load is represented by 010000000. The PN 63 signal 3202 is represented by $PN\ 63 = X^6 + X + 1$, and Pre-load is represented by 100111. The PN 511 signal 3201 comprises 511 symbols, the PN 63 signal 3202 comprises 63 symbols, and the control signal 3203 comprises 128 symbols. Therefore, the whole field sync signal 3102 comprises 828 symbols.

Next, the operation of the waveform equalization apparatus will be described with reference to FIG. 11.

Initially, when an 8-VSB-modulated DTV signal is inputted to the data input terminal 1001 as an input signal S1, the signal S1 is subjected to a waveform equalization process by the TF 1002 and the TF 1003 on the basis of the tap coefficients which are set by the tap coefficient control unit 1014, and the result of product-sum operation performed on the outputs from the internal taps of each of the TF 1002 and TF 1003, as well as a delay signal outputted from the TF 1002, are transmitted to the adder 1009. The adder 1009 sums the inputted signals, and outputs the resultant signal from the data output terminal 1011 as an output signal S2, and further, outputs the signal to the tap coefficient control unit 1014 and the delay unit 1004. The delay unit 1004 delays the output signal S2 by 32 symbols and outputs the delayed signal to the slicer 1005 and the delay unit 1010. The slicer 1005 maps the output of the delay unit 1004 to a closest value among the eight values, thereby removing an influence of noise of the signal on the subsequent processes. Each of the TF 1006, TF 1007, and TF 1008 waveform-equalizes the output of the slicer 1005, and outputs the result to the adder 1009. The delay unit 1010 delays the output of the delay unit 1004 by 192 symbols, i.e., by symbols to be delayed by the TF 1006, TF 1007, and TF 1008, and outputs the delayed signal to the tap coefficient control unit 1014. The delay unit 1010 is provided for outputting the output of the delay unit 1004 which is not octal-leveled by the slicer 1005, to the tap coefficient control unit 1014. The tap coefficient control unit 1014 obtains a difference between the output signal S2 and a most reliable symbol value among the eight symbol values shown in FIG. 13, and performs updation of the tap coefficients of the TF 1002, TF 1003, TF 1006, TF 1007, and TF 1008, using the difference, on the basis of the LMS (Least Mean Square) algorithm.

As described above, the TF 1002 and the TF 1003 function in a similar manner to a single TF, and these TFs serve as a so-called feed-forward type TF. Further, the TF 1006, TF 1007, and TF 1008 also function in a similar manner to a single TF, and these TFs serve as a so-called feed-back type TF, which performs waveform equalization on the signal that is 32 symbols delayed by the delay unit 1004, thereby to realize waveform equalization on the rear region which cannot be waveform-equalized by the TFs 1002 and 1003.

Next, the operation of the tap coefficient control unit 1014 will be described. The tap coefficient control unit 1014 obtains a difference between the inputted output signal S2 and the most reliable symbol value among the eight symbol values, and performs updation of the tap coefficients of the TF 1002, TF 1003, TF 1006, TF 1007, and TF 1008 on the basis of the LMS algorithm. The LMS algorithm is an algorithm for performing the n-th updation (n: positive integer) of a tap coefficient Ci of a tap i (i: positive integer) in any of the TF 1002, TF 1003, TF 1006, TF 1007, and TF 1008 on the basis of the following formula (1).

$$Ci(n+1)=Ci(n)-\alpha \times en \times di \quad (1)$$

where α indicates a fixed constant step size for deciding a coefficient updation amount, en is an error in the output signal, di indicates data of the tap i, and $-\alpha \times en \times di$ indicates the coefficient updation amount. The tap coefficient control unit 1014 updates the tap coefficients to be used in the TF 1002, TF 1003, TF 1006, TF 1007, and TF 1008 on the basis of formula (1). The output signal S2 is represented by the following formula (2).

$$S2(n)=\Sigma(i=0, 255)(Ci(n) \times di) \quad (2)$$

Next, a description will be given of a conventional waveform equalization apparatus used for cable digital broadcasting. Also in cable digital broadcasting, waveform equalization using the LMS algorithm is carried out. However, cable digital broadcasting usually employs, as a modulation method, not the 8-VSB modulation method but a QAM (Quadrature Amplitude Modulation) method.

FIG. 14 shows an arrangement of signal points, with respect to a DTV signal using a 64-state QAM method (hereinafter referred to as a 64-QAM signal). In FIG. 14, the abscissa shows the real number axis while the ordinate shows the imaginary number axis.

FIG. 15 is a block diagram illustrating a waveform equalization apparatus adapted to the 64-state QAM method. With reference to FIG. 15, a real component of a 64-QAM signal is inputted to a data input terminal 2001. The inputted real component of the 64-QAM signal is inputted to a TF 2003 and a TF 2005. The TF 2003 performs a product-sum operation of the outputs from the respective internal taps, and outputs the result as a signal obtained by a filtering process for waveform equalization, to a subtracter 2007. Further, a main signal of the TF 2003 is inputted to an adder 2009. Further, the outputs from the respective taps of the TF 2003 are inputted to a tap coefficient control unit 2013. The TF 2005 performs a product-sum operation of the outputs from the respective internal taps, and outputs the result to an adder 2008 as a signal obtained by a filtering process for waveform equalization.

On the other hand, an imaginary component of the 64-QAM signal is inputted to a data input terminal 2002. Then, the imaginary component of the 64-QAM signal is inputted to a TF 2004 and a TF 2006. The TF 2006 performs a product-sum operation of the outputs from the respective internal taps, and outputs the results to the adder 2008 as a signal obtained by a filtering process for waveform equalization. Further, a main signal of the TF 2006 is inputted to an adder 2010. Furthermore, the outputs from the respective taps of the TF 2006 are inputted to the tap coefficient control unit 2013. The TF 2004 performs a product-sum operation of the outputs from the respective internal taps, and outputs the result to the subtracter 2007 as a signal obtained by a filtering process for waveform equalization.

The subtracter 2007 subtracts the output of the product-sum operation result of the TF 2004 from the output of the product-sum operation result of the TF 2003. The adder 2009 adds the output of the subtracter 2007 and the main signal of the TF 2003, and outputs the sum as a real component of a complex output signal S22 from the data output terminal 2001 and, further, inputs the sum to the tap coefficient control unit 2013.

The adder 2008 adds the output of the product-sum operation result of the TF 2006 and the output of the product-sum operation result of the TF 2005. The adder 2010 adds the output of the adder 2008 and the main signal of the TF 2006, and outputs the sum as an imaginary component of the complex output signal S22 from the data output terminal 2012 and, further, inputs the sum to the tap coefficient control unit 2013. The tap coefficient control unit 2013 controls updation of the tap coefficients of the TFs 2003~2006, on the basis of the real component and imaginary component of the complex output signal S22.

The complex output signal S22 obtained from the waveform equalization apparatus is represented by the following formula (3).

$$S22(n)=\Sigma(i=0, 255)(Ci(n) \times di) \quad (3)$$

In formula (3), when Ci(n) and di are represented by complex elements as follows:

$$Di{=}di(r){+}jdi(i)$$

$$Ci(n)=Ci(n)(r)+jCi(n) \quad (i)$$

where (r) indicates real component data, and (i) indicates imaginary component data, the complex output signal S22 is represented as follows:

$$S22(n)=\Sigma(i=0, 255)((Ci(n)(r)+jCi(n)(i))\times(di(r)+jdi(i)))$$

$$=\Sigma(i=0, 255)((Ci(n)(r)\times di(r)-Ci(n)(i)\times di(i))+j(Ci(n)(r)\times di(i)+Ci(n)(i)\times di(r)))$$

When S22(n) is represented by $$S22(n)=S22(n)(r)+jS22(n)(i)$$

S22(n)(r) and JS22(n)(i) are represented by the following formulae (4) and (5), respectively.

$$S22(n)(r)=\Sigma(i-0, 255)(Ci(n)(r)\times di(r)-Ci(n)(i)\times di(i)) \quad (4)$$

$$S22(n)(i)=\Sigma(i=0, 255)(Ci(n)(r)\times di(i)+Ci(n)(i)\times di(r)) \quad (5)$$

Next, the tap coefficient updating operation by the tap coefficient control unit 2013 will be described.

The tap coefficient control unit 2013 controls updation of the tap coefficients of the TFs 2003–2006 on the basis of the real component and imaginary component of the inputted complex output signal S22 as well as the tap outputs from the TF 2003 and the TF 2006. A tap coefficient updation formula to be used in the case where a QAM signal is inputted is represented as follows, using the LMS algorithm, in a similar manner to the above-mentioned formula (1).

$$Ci(n+1)-Ci(n)-\alpha\times en\times di^* \quad (6)$$

where di* indicates the complex conjugate (complex number) of di.

When formula (6) is developed using complex expressions as follows:

$$Ci(n)-Ci(n)(r)+jCi(n)(i)$$

$$en=en(r)+jen(i)$$

$$di=di(r)+jdi(i)$$

$$di^*=di(r)-jdi(i)$$

the real component is represented by $$Ci(n+1)(r)=Ci(n)(r)-\alpha\times\{en(r)\times di(r)+en(i)\times di(i)\}$$

and the imaginary component is represented by $$Ci(n+1)(i)=Ci(n)(i)-\alpha\times\{en(i)\times di(r)+en(r)\times di(i)\}$$

The conventional waveform equalization apparatuses are constituted as described above, and a DTV signal with reduced distortion can be obtained by employing these waveform equalization apparatuses.

In the conventional waveform equalization apparatuses, however, the calculation of the output signal varies between the case where the VSB signal is inputted and the case where the QAM signal is inputted, as shown by formula (2) for the VSB signal and formulae (4) and (5) for the QAM signal, and therefore, separated waveform equalizers adapted to the respective signals must be prepared. Accordingly, when providing a waveform equalization apparatus adaptable to both of the VSB signal and the QAM signal, waveform equalizers adapted to the respective signals are required and these equalizers should be switched according to the input signal, resulting in an increase in the circuit scale.

Furthermore, the tap coefficient control unit 1014 calculates the tap coefficients using an error in the VSB signal, according to the LMS algorithm as shown by formula (1). Therefore, the signal before being sliced by the slicer 1005 must be delayed by a time equal to the time to be delayed by the TF 1006, TF 1007, and TF 1008, before it is inputted to the tap coefficient control unit 1014, and the delay unit 1010 is required as means for delaying the signal. However, such delay unit is large in circuit scale, resulting in an increase in the circuit scale of the whole waveform equalization apparatus.

Furthermore, in the conventional waveform equalization apparatus, adaptive control for optimizing the filter characteristic is carried out by updating the tap coefficients with the tap coefficient control unit 1014 on the basis of the output signal. Therefore, the filter characteristic is not constant but varies with the updation of the tap coefficients. As a result, it is difficult for the user to know the filter characteristic that is updated by the adaptive control.

SUMMARY OF THE INVENTION

The present invention is made to solve the above-described problems and has for its object to provide a waveform equalization apparatus which is able to perform waveform equalization on both of a VSB signal and a QAM signal, has a reduced circuit scale, and enables the user to easily know the filter characteristic that is updated by adaptive control.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a waveform equalization apparatus comprising: a first input terminal to which only a real component of a digital input signal to be waveform-equalized is applied; a second input terminal to which only an imaginary component of the digital input signal to be waveform-equalized is applied; plural transversal filters for performing filtering processes for waveform equalization on the digital input signal; a first output terminal from which only a real component of a waveform-equalized digital output signal is outputted; a second output terminal from which only an imaginary component of the waveform-equalized digital output signal is outputted; plural selectors for selecting a connection of lines which interconnect the first or second input terminal, the plural transversal filters, and the first or second output terminal; and a filter construction control signal generator for generating a filter construction control signal which controls the plural selectors to control the filter construction such that the whole apparatus becomes a real component filter when the digital input signal is a signal having only a real component, and becomes a complex filter when the digital input signal is a signal leaving both a real component and an imaginary component.

According to a second aspect of the present invention in the generating a filter operation control signal which changes the filter operation by changing the tap length of the predetermined transversal filter.

According to a sixth aspect of the present invention, there is provided a waveform equalization apparatus comprising a first input terminal to which a digital input signal having only a real component is inputted; a second input terminal to which a digital input signal having only an imaginary component is inputted; first and second output terminals; first to fourth transversal filter (hereinafter referred to as TF) units for performing filtering processes for waveform equalization; a delay means for delaying an input signal to output a delayed signal; and first and second tap coefficient control means for controlling tap coefficients of the first to fourth TF units; wherein, when a signal is applied to only the first input terminal, the first to fourth TF units are connected as follows: the signal applied to the first input terminal is inputted to the first TF unit; a signal which is obtained by delaying a signal outputted from the first output terminal with the delay means is inputted to the second TF unit; a delay output from the second TF unit is inputted to the third TF unit; a delay output from the third TF unit is inputted to the fourth TF unit; and signals which are filter-processed by the second to fourth TF units are added to a signal which is filter-processed by the first. TF unit and a main signal component of the first TF unit, and the result of the addition is outputted from the first output terminal; and waveform equalization is performed on the input signal to the first input terminal while controlling the tap coefficients of the first to fourth TF units with the first tap coefficient control means on the basis of the output from the first output terminal, and a signal so obtained is outputted from the first output terminal; and when signals are applied to both of the first input terminal and the second input terminal, the first to fourth TF units are connected as follows: the signal applied to the first input terminal is inputted to the first and third TF units; the signal applied to the second input terminal is inputted to the second and fourth TF units; the main signal component of the first TF unit is added to a value which is obtained by subtracting the signal filter-processed by the second TF unit from the signal filter-processed by the first TF unit, and the result of the addition is outputted from the first data output terminal; and the signal filter-processed by the third TF unit, the signal filter-processed by the fourth TF unit, and the main signal component of the fourth TF unit are added, and the result of the addition is outputted from the second output terminal; and the input signals applied to the first and second input terminals are subjected to waveform equalization while controlling the tap coefficients of the first to fourth TF units with the second tap coefficient control means on the basis of the outputs from the first and second output terminals, and the real component of the signal so obtained is outputted from the first output terminal while the imaginary component of the signal so obtained is outputted from the second output terminal.

According to a seventh aspect of the present invention, in the waveform equalization apparatus according to the sixth aspect, each of the first and fourth TF units is provided with n pieces of TFs (n: integer equal to or larger than 3), and the respective TFs are connected such that a delay output from the m-th TF ($1 \leq m \leq n-1$, m: integer) is inputted to the (m+1)th TF; and the waveform equalization apparatus further includes: a first selection means for receiving delay outputs from the first to (n−1)th TFs of the first TF unit, respectively, selecting one of the plural delay outputs on the basis of a center tap control signal that is supplied from the outside, and outputting the selected signal as a main signal component of the first TF unit; and a second selection means for receiving delay outputs from the first to (n−1)th TFs of the fourth TF unit, respectively, selecting one of the plural delay outputs on the basis of the center tap control signal, and outputting the selected delay output as a main signal component of the fourth TF unit.

According to an eighth aspect of the present invention, in the waveform equalization apparatus according to the sixth aspect, at least one of the first to fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF, and the operating state of at least one of the TFs is switched between the active state and the halt state by a filter operation control signal that is supplied from the outside.

According to a ninth aspect of the present invention, in the waveform equalization apparatus according to the sixth aspect, each of the first and fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF; each of the second and third TF units is provided with s pieces of TFs (s: integer equal to or larger than 2), and the respective TFs are connected such that a delay output from the t-th TF ($1 \leq t \leq s-1$, t: integer) is inputted to the (t+1)th TF; and the operating state of at least one TF among the plural TFs constituting each of the first to fourth TF units is switched between the active state and the halt state by a filter operation control signal that is supplied from the outside.

According to a tenth aspect of the present invention, there is provided a waveform equalization apparatus comprising: a first input terminal to which a digital input signal having only a real component is applied; a second input terminal to which a digital input signal having only an imaginary component is applied; a first TF unit for receiving the input signal applied to the first input terminal, and outputting a signal which is subjected to a filtering process for waveform equalization, and a main signal component in the filtering process; a first selection circuit having first and second inputs, receiving, as the second input, the input signal applied to the second input terminal, and selecting either of the first and second inputs to output the selected input; a second TF unit for receiving the output of the first selection circuit, and outputting a signal which is subjected to a filtering process for waveform equalization, and a delay signal obtained by delaying the input signal; a second selector for selecting either the input signal applied to the first input terminal or the delay signal outputted from the second TF unit, and outputting the selected signal; a third TF unit for receiving the output of the second selection circuit, and outputting a signal which is subjected to a filtering process for waveform equalization, and a delay signal obtained by delaying the input signal; a third selector for selecting either the input signal applied to the second input terminal or the delay signal outputted from the third TF unit, and outputting the selected signal; a fourth TF unit for receiving the output of the third selection circuit, and outputting a signal which is subjected to a filtering process for waveform equalization, and a main signal component in the filtering process; a fourth selector for selecting either the signal obtained by the filtering process in the second TF unit or a signal obtained by inverting the filter-processed signal, and outputting the selected signal; a fifth selector for selecting either a signal which is obtained by adding the output of the fourth selector and the signal obtained by the filtering process in the first TF unit, or the main signal component outputted from the fourth TF unit, and outputting the selected signal; a sixth selector for selecting either a signal which is obtained by adding the output of the fourth selector and the signal obtained by the filtering process in the first TF unit, or a signal which is obtained by adding the signal obtained by the filtering process in the third TF unit and the signal obtained by the filtering process in the fourth TF unit, and outputting the selected signal; a first output terminal for outputting a signal which is obtained by adding the output of the sixth selector and the main signal component of the first TF unit; a delay unit for delaying a signal which is obtained by adding the output of the sixth selector and the main signal component of the first TF unit, and outputting the delayed signal so that it becomes a first input to the first selector; a second output terminal for outputting a signal which is obtained by adding the output of the fifth selector, the signal obtained by the filtering process in the third TF unit, and the signal obtained by the filtering process in the fourth TF unit; a first tap coefficient control means for controlling the tap coefficients of the first to fourth TF units, on the basis of a signal which is obtained by adding the output of the sixth selector and the main signal component of the first TF unit; and a second tap coefficient control means for controlling the tap coefficients of the first to fourth TF units, on the basis of the signal which is obtained by adding the output of the sixth selector and the main signal component of the first TF unit, as well as the signal which is obtained by adding the output of the fifth selector, the signal obtained by the filtering process in the third TF unit, and the signal obtained by the filtering process in the fourth TF unit; wherein, when a signal is inputted to only the first input terminal, the first selector selects the input from the delay unit and outputs it; the second selector selects the delay signal from the second TF unit and outputs it; the third selector selects the delay signal from the third TF unit and outputs it; the fourth selector selects the signal which is obtained by the filtering process in the second TF unit, and outputs it; the fifth selector selects the signal which is obtained by adding the output of the fourth selector and the signal obtained by the filtering process in the first TF unit, and outputs it; the sixth selector selects the signal which is obtained by adding the output of the fifth selector, the signal obtained by the filtering process in the third TF unit, and the signal obtained by the filtering process in the fourth TF unit, and outputs it; and the first tap coefficient control means controls the tap coefficients of the first to fourth TF units; and when signals are inputted to both of the first input terminal and the second input terminal, the first selector selects the input of the second input terminal and outputs it; the second selector selects the input of the first input terminal and outputs it; the third selector selects the input of the second input terminal and outputs it; the fourth selector selects an inverted signal of the signal which is obtained by the filtering process in the second TF unit, and outputs it; the fifth selector selects the main signal component of the fourth TF unit and outputs it; the sixth selector selects the signal which is obtained by adding the output of the fourth selector and the signal obtained by the filtering process in the first TF unit, and outputs it; and the first tap coefficient control means controls the tap coefficients of the first to fourth TF units.

According to an eleventh aspect of the present invention, in the waveform equalization apparatus according to the tenth aspect, each of the first and fourth TF units is provided with n pieces of TFs (n: integer equal to or larger than 3), and the respective TFs are connected such that a delay output from the m-th TF ($1 \leq m \leq n-1$, m: integer) is inputted to the (m+1)th TF, and a signal which is obtained by adding the signals that are filter-processed by the respective TFs is outputted as a filter-processed output from each of the first and fourth TF units; and the waveform equalization apparatus further includes: a seventh selection means for receiving delay outputs from the first to (n−1)th TFs of the first TF unit, respectively, selecting one of the plural delay outputs on the basis of a center tap control signal that is supplied from the outside, and outputting the selected signal as a main signal component of the first TF unit; and an eighth selection means for receiving delay outputs from the first to (n−1)th TFs of the fourth TF unit, respectively, selecting one of the plural delay outputs on the basis of the center tap control signal, and outputting the selected signal as a main signal component of the fourth TF unit.

According to a twelfth aspect of the present invention, in the waveform equalization apparatus according to the tenth aspect, at least one of the first to fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF, and the operating state of at least one of the TFs is switched between the active state and the halt state by a filter operation control signal that is supplied from the outside.

According to a thirteenth aspect of the present invention, in the waveform equalization apparatus according to the tenth aspect, each of the first and fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF; each of the second and third TF units is provided with s pieces of TFs (s: integer equal to or larger than 2), and the respective TFs are connected such that a delay output from the t-th TF ($1 \leq t \leq s-1$, t: integer) is inputted to the (t+1)th TF; and the operating state of at least one TF among the plural TFs constituting each of the first to fourth TF units is switched between the active state and the halt state by a filter operation control signal that is supplied from the outside.

According to a fourteenth aspect of the present invention, there is provided a waveform equalization apparatus comprising: an input terminal to which a digital input signal having only a real component is applied; a first TF for performing a waveform equalization filtering process on the input signal applied to the input terminal; an adder for receiving, as one of plural inputs, the filter-processed output from the first TF, and adding the inputted signals to output the result of the addition; an output terminal for outputting the output of the adder; a delay unit for delaying the output of the adder, and outputting the delayed signal; a slicer for slicing the output of the delay unit; a second TF for performing a waveform equalization filtering process on the output of the slicer, inputting the filter-processed signal to the adder, and outputting a delay output obtained by delaying the output of the slicer, and signals obtained from the respective taps; a third TF for performing a waveform equalization filtering process on the delay output of the second TF, inputting the filter-processed signal to the adder, and outputting a delay output obtained by delaying the delay output of the second TF, and signals obtained from the respective taps; a fourth TF for performing a waveform equalization filtering process on the delay output of the third TF, inputting the filter-processed signal to the adder, and outputting signals obtained from the respective taps; and a tap coefficient control means for controlling the tap coefficients of the first to fourth TFs on the basis of the output of the adder, and the signals obtained from the respective taps of the second to fourth TFs.

According to a fifteenth aspect of the present invention, there is provided a waveform equalization apparatus comprising: an input terminal to which a digital signal is applied; a test signal generator for generating a signal for test; an input signal selection means for selecting either the signal applied to the input terminal or the lost signal, on the basis of a mode input signal that is supplied from the outside; a digital filter unit having at least one TF, and performing a filtering process for waveform equalization on the signal that is selected by the input signal selection means; an output terminal for outputting the signal that is filter-processed by the digital filter unit; and a tap coefficient control means for updating the tap coefficient of the TF in the digital filter unit on the basis of the signal that is filter-processed by the digital filter unit when the input signal selection means selects the signal applied to the input signal, and performing no updation of the tap coefficient when the input signal selection means selects the test signal.

DETAILED DESCRIPTION OF THE PREFERRED EMBODIMENTS

Embodiment 1

Figure 1:
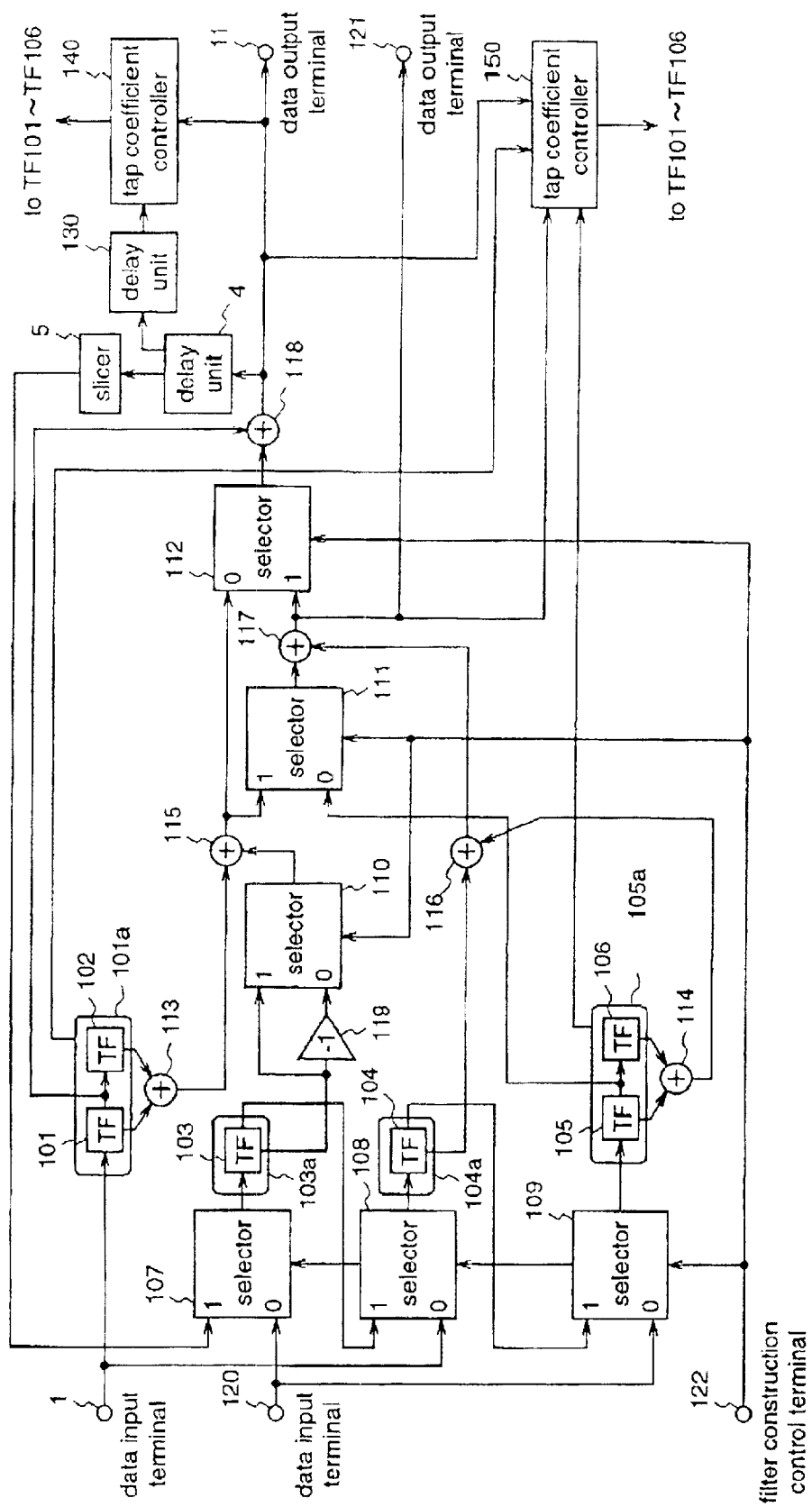
FIG. 1 is a block diagram illustrating the construction of a waveform equalization apparatus according to a first embodiment of the present invention.

FIG. 1 is a block diagram illustrating a waveform equalization apparatus according to a first embodiment of the present invention. With reference to FIG. 1, a 32-tap TF 101 included in a transversal filter unit (hereinafter referred to as a TF unit) 101a receives an input signal applied to a data input terminal 1, calculates products of outputs from plural internal taps (not shown) and tap coefficients corresponding to the respective taps, sums the products so obtained, and outputs the result of the product-sum operation, as a result of a filtering process for waveform equalization, to an adder 113. Further, the 32 tap TF 101 delays the input signal using an internal delay circuit (not shown), and outputs a delay signal so obtained to a 32-tap TF 102 and an adder 118. The 32-tap TF 102 included in the TF unit 101a receives the delay signal outputted from the TF 101, and outputs a result of a product-sum operation which is obtained by summing up the products of outputs from plural internal taps (not shown) and the tap coefficients corresponding to the respective taps, as a result of a filtering process, to the adder 113. The TF unit 101a is equivalent to a 64-tap TF, and the delay signal outputted from the TF 101 to the adder 118 serves as a main signal component of the TF unit 101a. In this first embodiment, a 64-tap TF may be employed instead of the TF unit 101a comprising the TF 101 and the TF 102. The adder 113 adds the delay signal outputted from the TF 101 and the TF 102, and outputs the sum to an adder 115.

A selector 107, having first and second inputs, receives the input signal applied to the data input terminal as the second input, selects either the first input or the second input, and outputs the selected one to a TF unit 103a. A 64-tap TF 103 as a component of the TF unit 103a outputs a result of a product-sum operation which is performed on the outputs from the respective internal taps and the corresponding tap coefficients, as a result of a filtering process, to a selector 110 and a code inverter 119 and, further, outputs a delay signal to a selector 108. The selector 108 selects either the delay signal from the TF unit 103a or the input signal from the data input terminal 1, and outputs the selected signal to a TF unit 104a. A 64-tap TF 104 as a component of the TF unit 104a outputs a result of a product-sum operation which is performed on the outputs of the respective internal taps and the corresponding tap coefficients, as a result of a filtering process, to an adder 116, and further, outputs a delay signal to a selector 109.

The selector 109 selects either the input signal from the data input terminal 120 or the delay signal from the TF unit 104a, and outputs the selected signal to a TF unit 105a. A 32-tap TF 105 as a constituent of the TF unit 105a receives the output of the selector 109, and outputs a result of a product-sum operation which is obtained by summing up the products of the outputs from the plural internal taps and the tap coefficients corresponding to the respective taps, as a result of a filtering process, to an adder 114, and further, outputs a delay signal to a TF 106 and a selector 111. Further, the 32-tap TF 106 as a component of the TF unit 105a receives the delay signal from the TF 105, and outputs a result of a product-sum operation which is obtained by summing up the products of the outputs from the plural internal taps and the tap coefficients corresponding to the respective taps, as a result of a filtering process, to the adder 114. The TF unit 105a is equivalent to a 64-tap TF, and the delay signal outputted from the TF 105 to the selector 111 serves as a main signal component of the TF unit 105a. In this first embodiment, a 64-tap TF may be employed instead of the TF unit 105a comprising the TF 105 and the TF 106.

The adder 114 output a signal obtained by adding the results of the product-sum operations from the TF 105 and the TF 106, to the adder 116. The adder 116 adds the output from the adder 114 and the result of the product-sum operation from the TF 104, and outputs the sum to an adder 117. The code inverter 119 receives the result of the product-sum operation outputted from the TF unit 103*a*, and outputs a signal obtained by inverting the codes of the input signal, to the selector 110. The selector 110 selects either the output of the code inverter 119 or the result of the product-sum operation from the TF unit 103*a*, and outputs the selected one to the adder 115. The adder 115 adds the output from the selector 110 and the output from the adder 113, and outputs a signal obtained by the addition to the selectors 112 and 111. The selector 111 selects either the delay signal from the TF 105 in the TF unit 105*a* (i.e., the main signal component of the TF unit 105*a*) or the output from the adder 115, and outputs the selected one to the adder 117. The adder 117 adds the output of the selector 111 and the output, of the adder 116, and outputs a signal obtained by the addition, as an output signal, from the data output terminal 121, and further, outputs the signal to the selector 112 and a tap coefficient controller 150. The selector 112 selects either the output of the adder 117 or the output of the adder 115, and outputs the selected one to the adder 118. The adder 118 adds the output of the selector 112 and the delay signal from the TF 101 in the TF unit 101*a* (i.e., the main signal component of the TF unit 101*a*), and outputs a signal obtained by the addition, as an output signal, from the data output terminal 11, and further, outputs the signal to a tap coefficient controller 140, the tap coefficient controller 150, and a delay unit 4.

The delay unit 4 delays the output signal from the adder 118 by 32 symbols, and outputs the delayed signal to a slicer 5 and a value among plural values the VSB signal can take (in this case, eight values), and inputs the mapped value to the selector 107 as a first input. The delay until 130 delays the output signal from the delay unit 4 by 192 symbols, and outputs the delayed signal to the tap coefficient controller 140. The tap coefficient controller 140 receives the output signal to be outputted from the data output terminal 11, and the output from the delay unit 130, obtains differences between these signals and a most reliable symbol among the eight kinds of symbol values, obtains tap coefficients to be used in the TFs 101~106, using the differences so obtained, on the basis of the LMS algorithm, and transmits control signals (not shown) to the TFs 101~106, thereby updating the respective tap coefficients to be used in the TFs 101~106 with the obtained tap coefficients. The tap coefficient controller 150 receives the output signal from the data output terminal 11, the output signal from the data output terminal 121, the signals obtained from the respective taps in the TF unit 101*a*, and the signals obtained from the respective taps in the TF unit 105*a*, and obtains differences between these signal and a most reliable symbol value among the symbol values the QAM signal can take, obtains tap coefficients to be used in the TFs 101~106 on the basis of the LMS algorithm using these differences, and transmits control signals (not shown) to the TFs 101~106, thereby updating the respective tap coefficients to be used in the TFs 101~106 with the obtained tap coefficients. A control signal for controlling the selectors 107~112 is supplied to a filter construction control terminal 122 from the outside. Each of the selectors 107~112 is supplied with the control signal, and each selector selects one of the two input signals according to the control signal. That is, the control signal controls switching of the input signals. This control signal is previously stored in an external register or the like (not shown), and is inputted to the filter construction control terminal 122, according to the signal inputted to the waveform equalization apparatus, on the basis of an instruction from an external controller or the like (not shown).

Figure 2:
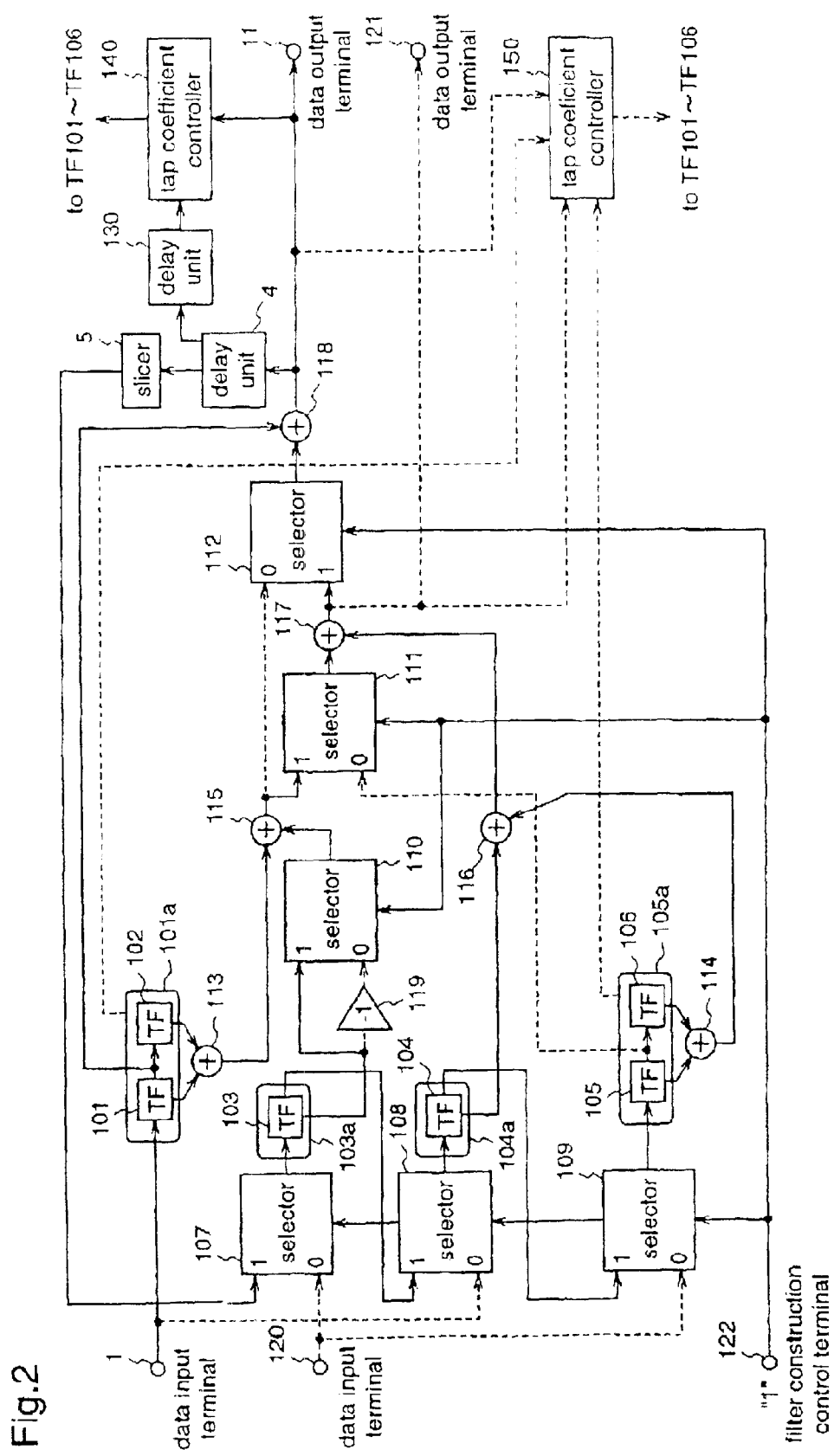
FIG. 2 is a diagram for explaining the operation of the waveform equalization apparatus according to the first embodiment, in the case where a VSB signal is inputted to the apparatus.

FIG. 2 is a block diagram for explaining the operation of the waveform equalization apparatus according to the first embodiment in the case where a DTV signal having only a real component and employing the VSB modulation method (hereinafter refereed to as a VSB signal) is inputted to the apparatus. FIG. 2 is identical to FIG. 1 except that unused signal lines are shown by dotted lines. Hereinafter, a description will be given of the operation of the waveform equalization apparatus in the case where a 8-VSB signal is inputted to the apparatus, with reference to FIG. 2.

First of all, a filter construction control signal for switching the inputs to each of the selectors 107~112 in accordance with the VSB signal, for example, "1", is supplied from the outside to the filter construction control terminal 122, while a 8-VSB signal is inputted to the data input terminal 1.

In the TF unit 101*a*, the TF 101 performs a filtering process on the 8-VSB signal inputted to the data input terminal 1, and outputs the filter-processed signal to the adder 113, and outputs a delay signal which is obtained by delaying the input signal with the internal delay circuit, to the TF 102. Further, the TF 101 outputs the delay signal to the adder 118, as a main signal component of the TF unit 101*a*. The TF 102 performs a filtering process on the delay signal outputted from the TF 101, and outputs the filter-processed signal to the adder 113. The adder 113 adds the filter-processed signals from the TF 101 and the TF 102, and outputs the sum.

The selector 107 selects the output of the slicer 5 on the basis of the filter construction control signal, and outputs it to the TF 103. The TF 103 performs a filtering process on the output of the slicer, and outputs the filter-processed signal, and further, outputs a delay signal which is obtained by delaying the signal with the internal delay circuit. The selector 108 selects the delay signal outputted from the TF 103, on the basis of the filter construction control signal, and outputs it to the TF 104. The TF 104 perform a filtering process on the delay signal outputted from the TF 103, and outputs the filter-processed signal and a delay signal. The selector 109 selects the delay signal from the TF 104, on the basis of the filter construction control signal, and outputs it to the TF unit 105*a*.

In the TF unit 105*a*, the TF 105 performs a filtering process on the delay signal outputted from the TF 104, and outputs the filter-processed signal to the adder 114, and outputs a delay signal to the TF 106. The TF 106 performs a filtering process on the delay signal, and outputs the filter-processed signal to the adder 114. In this way, the selectors 107~109 are controlled so as to perform signal selecting operations by the filter construction control signal "1" which is inputted to the filter construction control terminal 122, whereby the TF 103, the TF 104, the TF 105, and the TF 106 are connected in series. That is, the TF unit 103*a*, the TF unit 104*a*, and the TF unit 105*a* are connected in series. The adder 114 adds the signal which is filter-processed by the TF 105 and the signal which is filter-processed by the TF 106, and outputs the sum to the adder 116. The adder 116 adds the output of the adder 114 and the filter-processed signal obtained from the TF 104, and outputs the sum to the adder 117.

The selector 110 selects the filter-processed signal outputted from the TF 103, on the basis of the filter construction control signal, and outputs it to the adder 115. The adder 115 adds the output of the selector 110 and the output of the adder 113, and outputs the sum. The selector 111 selects the output of the adder 115 on the basis of the filter construction control signal, and supplies it to the adder 117. The adder 117 adds the output of the selector 111 and the output of the adder 116, and outputs the sum. The selector 112 selects the output of the adder 117, and supplies it to the adder 118. The adder 118 adds the output of the selector 112 and the delay signal from the TF 101 (i.e., the main signal component of the TF unit 101a), and outputs a signal obtained by the addition, from the data output terminal 11, as an output signal which is obtained by subjecting the VSB signal to waveform equalization. Further, the adder 118 outputs the signal to the delay unit 4 and the tap coefficient control circuit 140. The delay unit 4 delays the output signal from the adder 118 to synchronize the timing of the filtering process by the TF unit 101a with the timings of the filtering processes by the TF unit 103a, the TF unit 104a, and the TF unit 105a, and outputs the delayed signal to the slicer 5. In this first embodiment, a signal obtained by delaying the output of the adder 118 by 32 symbols is outputted to the slicer 5. The slicer 5 maps the output of the delay unit 4 to a closest value among the eight values the VSB signal can take. The delay unit 130 delays the output of the delay unit 4 by symbols to be delayed by the 64-tap TF unit 103a, the 64-tap TF unit 104a, and the 64-tap TF unit 105a which are connected in series, i.e., by 192 symbols, and output the delayed signal to the tap coefficient control circuit 140. The tap coefficient control circuit 140 obtains a difference between the output of the data output terminal 11 (i.e., the output of the adder 118) and a most reliable symbol value among the eight symbol values, and a difference between the output of the delay unit 130 and the most reliable symbol value, and obtains tap coefficients to be used in the TFs 101~106 on the basis of the LMS algorithm using these differences, and transmits a control signal which instructs updation of the tap coefficients to the TFs 101~106, thereby updating the tap coefficients.

In this way, as for the VSB signal comprising the real component, the TFs 101~106 are constructed as real component filters by controlling the selectors 107~112. That is, the TF unit 101a is constructed as a feed-forward type TF, while the TF unit 103a, the TF unit 104a, and the TF unit 105a are constructed as feed-back type TFs connected in series.

Figure 3:
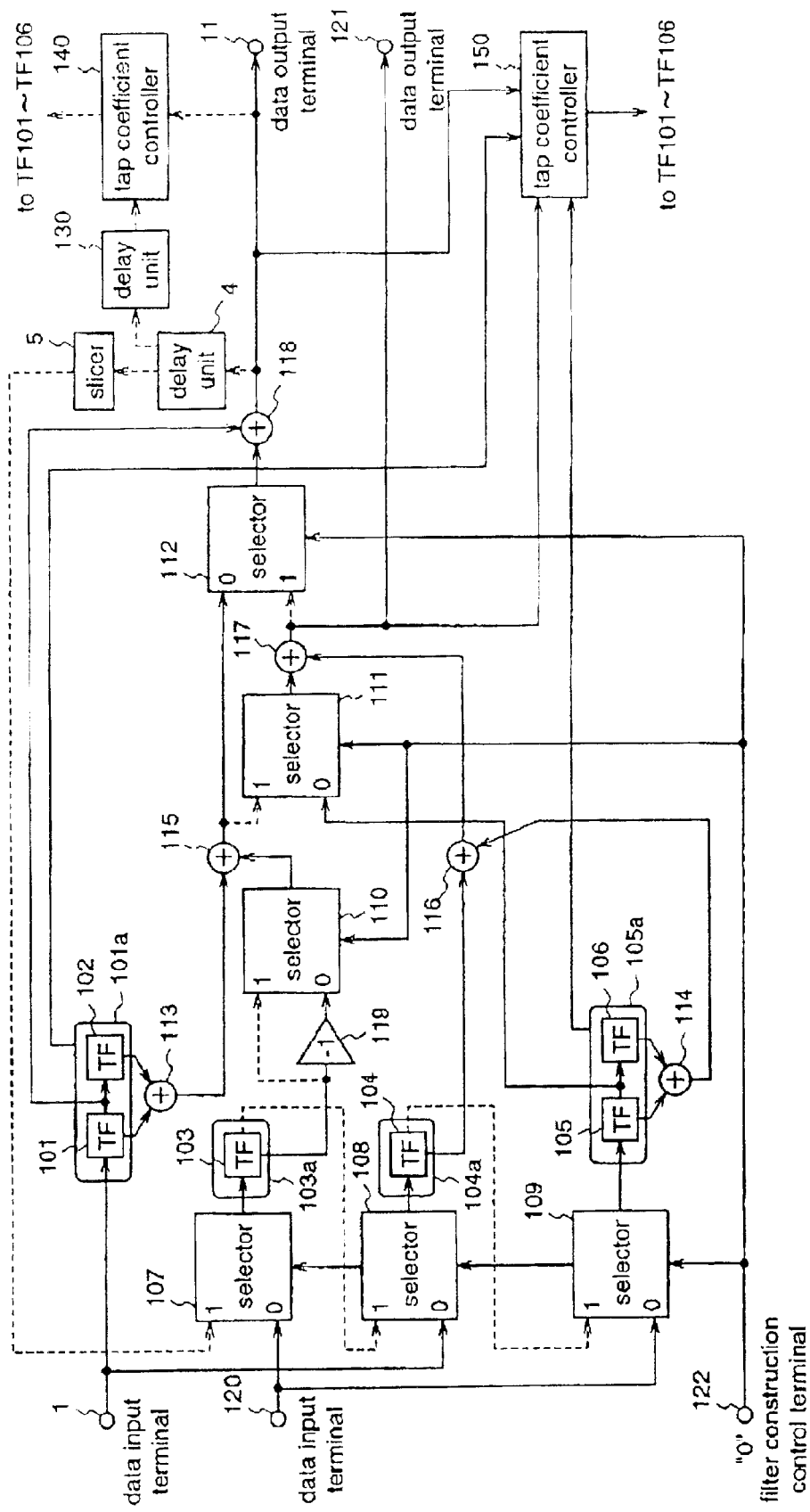
FIG. 3 is a diagram for explaining the operation of the waveform equalization apparatus according to the first embodiment, in the case where a QAM signal is inputted to the apparatus.

FIG. 3 is a block diagram for explaining the operation of the waveform equalization apparatus according to the first embodiment in the case where a DTV signal comprising a real component and an imaginary component and employing the QAM method (hereinafter referred to as a QAM signal) is inputted to the apparatus. FIG. 3 is identical to FIG. 1 except that unused signal lines are indicated by dotted lines. Hereinafter, a description will be given of the operation of the waveform equalization apparatus in the case where a 64-QAM signal is inputted to the apparatus, with reference to FIG. 3.

Initially, a control signal for switching the inputs to each of the selectors 107~112 according to the QAM signal, for example, "0", is supplied from the outside to the filter construction control terminal 122, and a real component of a 64-QAM signal is inputted to the data input terminal 1 while an imaginary component thereof is inputted to the data input terminal 120.

In the TF unit 101a, the TF 101 performs a filtering process on the real component of the QAM signal which is inputted to the data input terminal 1, and outputs the filter-processed signal to the adder 113, and outputs a delay signal to the TF 102. Further, the adder 118 outputs the signal obtained by the addition to the tap coefficient control unit 150.

The selector 109 selects the imaginary component of the QAM signal supplied from the data input terminal 120, on the basis of the filter construction control signal, and outputs it to the TF unit 105a. In the TF unit 105a, the TF 105 performs a filtering process on the imaginary component of the QAM signal, and outputs the filter-processed signal to the adder 114, and outputs a delay signal to the TF 106. The TF 106 in the TF unit 105a performs a filtering process on this delay signal, and outputs the filter-processed signal to the adder 114. Further, the delay signal outputted from the TF 105 is inputted to the selector 111, as a main signal component of the TF unit 105a. The adder 114 adds the filter-processed signal from the TF 105 and the filter-processed signal from the TF 106, and outputs the sum to the adder 116.

The selector 108 selects the real component of the QAM signal which is inputted to the data input terminal 1, on the basis of the filter construction control signal, and outputs it to the TF 104. The TF 104 outputs the filter-processed signal to the adder 136. The adder 116 adds the filter-processed signal from the TF 104 and the output of the adder 114, and outputs the sum to the adder 117. The selector 111 selects the main signal component of the TF unit 105a, and outputs it to the adder 117. The adder 117 adds the output of the adder 116 and the output of the selector 111, and outputs the result of the addition, as an imaginary component of a waveform-equalized QAM signal, from the data output terminal 121. Further, the adder 117 outputs the result of the addition to the tap coefficient controller 150. The tap coefficient controller 150 calculates differences between a most reliable symbol value among the symbol values the QAM signal can take, and the output of the adder 118, the output of the adder 117, the outputs or the respective taps of the TF unit 101a, and the outputs of the respective taps of the TF unit 105a, and obtains tap coefficients to be used in the TF 101~TF 106 on the basis of the LMS algorithm, using these differences, and transmits a control signal instructing updation of the tap coefficients to the TFs 101~106, thereby updating the tap coefficients.

In this way, as for the QAM signal having both of the real component and the imaginary component, the TFs 101~106 are connected as complex filters by controlling the selectors 107~112.

Generally, a TF having many taps is required for waveform equalization of a VSB signal. On the other hand, plural TFs connected in parallel are required for complex operations in waveform equalization of a QAM signal although the number of taps in each TF may be smaller. Therefore, in this first embodiment, the four TF units, i.e., the TF units 101a, 103a, 104, and 105a, are prepared in advance, and part of the four TF units, i.e., the TF units 103a, 104a, and 105a, are connected in series to make a long TF having many taps when the input signal is a VSB signal, while the four TF units are connected in parallel to realize a filtering process based on complex operations when the input signal is a QAM signal. Accordingly, the waveform equalization apparatus of this first embodiment is adaptable to the waveform equalization processes for the both signals, and delivers sufficient performances in the processes for the respective signals.

Further, a TF is usually very large in circuit scale as compared with other circuits such as a selector and, therefore, it occupies the greater part of a waveform equalization circuit. In the waveform equalization apparatus of the first embodiment, however, the input to the filter construction control terminal 122 is varied between the case where the input signal is a VSB signal and the case where it is a QAM signal, whereby the whole filter is constructed as a real component filter when the input signal is a VSB signal while it is constructed as a complex filter when the input signal is a QAM signal. Therefore, the waveform equalization processes for the VSB signal and the QAM signal can share the TFs, whereby both of the VSB signal and the QAM signal can be waveform-equalized without increasing the number of TFs, resulting in a waveform equalization apparatus which can perform waveform equalization on the VSB signal and the QAM signal without increasing the circuit scale.

Embodiment 2

Figure 4:
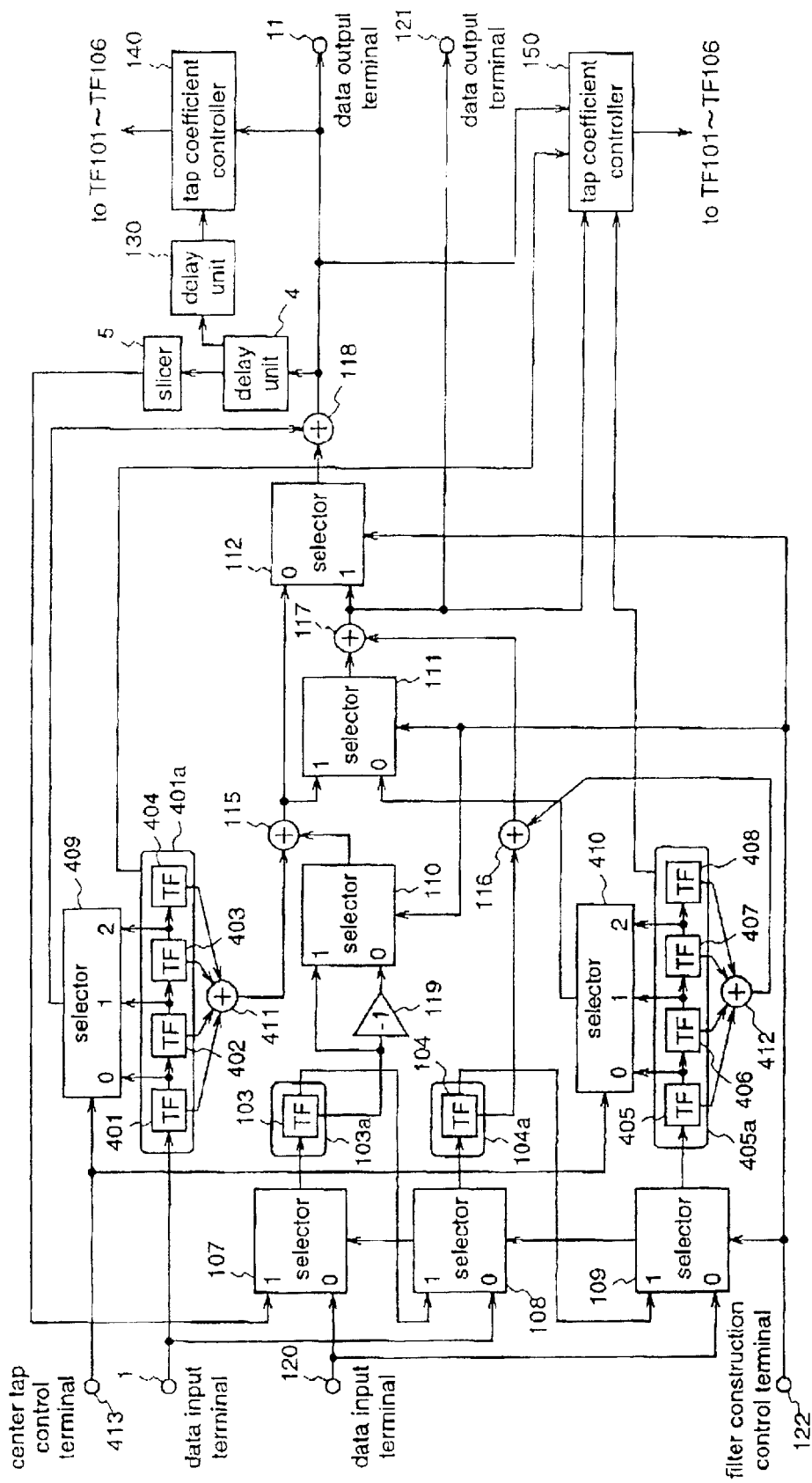
FIG. 4 is a block diagram illustrating a waveform equalization apparatus according to a second embodiment of the present invention.

FIG. 4 is a block diagram illustrating a waveform equalization apparatus according to a second embodiment of the present invention. In FIG. 4, the same reference numerals as those shown in FIG. 1 designate the same or corresponding parts. The waveform equalization apparatus according to the second embodiment is different from the waveform equalization apparatus according to the first embodiment only in that a TF unit 401a and a TF unit 405a are provided instead of the TF unit 101a and the TF unit 105a, and one of delay signals outputted from TFs 401~403 in the TF unit 401a and one of delay signals outputted from TFs 405~407 in the TF unit 405a are selected by a selector 409 and a selector 410, respectively, and the delay signals so selected are used as main signal components of the TF unit 401a and the TF unit 405a, respectively.

The TF unit 401a is provided with 16-tap TFs 401~404. The TF 401 receives an input signal applied to the data input terminal 1, and outputs a signal obtained by performing a filtering process on the input signal, to an adder 411, and outputs a delay signal thereof to the TF 402 and a selector 409. The TF 402 receives the delay signal from the TF 401, and outputs a signal obtained by a filtering process to the adder 411, and outputs a delay signal to the TF 403 and the selector 409. The TF 403 receives the delay signal from the TF 402, and outputs a signal obtained by a filtering process to the adder 411, and outputs a delay signal to the TF 404 and the selector 409. The TF 404 receives the delay signal from the TF 403, and outputs a signal obtained by a filtering process to the adder 411. The TF unit 401a is equivalent to a 64-tap TF, and one of the delay signals outputted from the TFs 401~403 to the selector 409 serves as a main signal component of the TF unit 401a. The selector 409 selects one of the delay signals supplied from the TFs 401~403, on the basis of a center tap control signal indicating a center tap position, which signal is supplied from a center tap control terminal 413, and outputs the selected signal. In this second embodiment, it is assumed that the delay signal from the TF 401 is elected when the center tap control signal is "0", the delay signal from the TF 402 is selected when the center tap control signal is "1", and the delay signal from the TF 403 is selected when the center tap control signal is "2". The center tap control signal is previously stored in an external register or the like (not shown), and it is supplied to the center tap control terminal 413 according to an instruction from an external controller or the like (not shown). The adder 411 sums the signals which are outputted from the respective TFs 401~404 as the results of the filtering processes, and outputs the sum to the adder 115.

The TF unit 405a is provided with 16-tap TFs 405~408. The TF 405 receives the signal outputted from the selector 109, and outputs a signal obtained by performing a filtering process on the signal, to an adder 412, and outputs a delay signal thereof to the TF 406 and a selector 410. The TF 406 receives the delay signal from the TF 405, and outputs a signal obtained by a filtering process to the adder 412, and outputs a delay signal to the TF 407 and the selector 410.

The TF 407 receives the delay signal from the TF 406, and outputs a signal obtained by a filtering process to the adder 412, and outputs a delay signal to the TF 408 and the selector 410. The TF 408 receives the delay signal from the TF 407, and outputs a signal obtained by a filtering process to the adder 412. The TF unit 405a is equivalent to a 64-tap TF, and one of the delay signals outputted from the TFs 405~407 to the selector 410 serves as a main signal component of the TF unit 405a. The selector 410 selects one of the delay signals supplied from the TFs 405~407, on the basis of the center tap control signal supplied from the center tap control terminal 413. In this second embodiment, it is assumed that the delay signal from the TF 405 is selected when the center tap control signal is "0", the delay signal from the TF 406 is selected when the center tap control signal is "1", and the delay signal from the TF 407 is selected when the center tap control signal is "2". The adder 412 sums the signals which are outputted from the respective TFs 405~408 as the results of the filtering processes, and outputs the sum to the adder 116.

Figure 5:
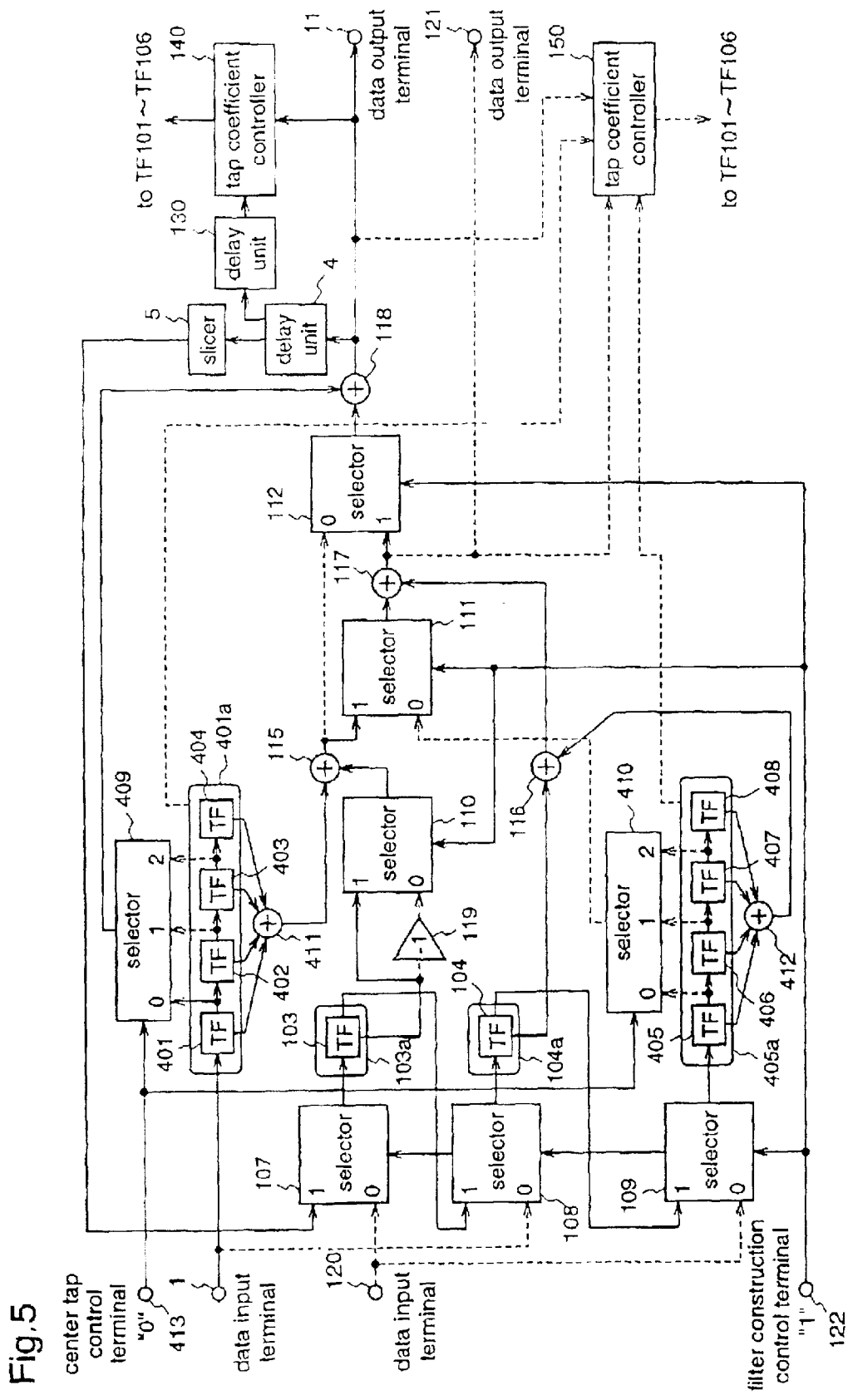
FIG. 5 is a diagram for explaining the operation of the waveform equalization apparatus according to the second embodiment in the case where a VSB signal is inputted to the apparatus.

FIG. 5 is a block diagram for explaining the operation of the waveform equalization apparatus according to the second embodiment in the case where a VSB signal is inputted to the apparatus. The waveform equalization apparatus shown in FIG. 5 is different from that shown in FIG. 4 only in that unused signal lines are indicated by dotted lines. Hereinafter, the operation of the waveform equalization apparatus according to the second embodiment in the case where a 8-VSB signal is inputted will be described with reference to FIG. 5. As for the operations of the same constituents as those described for the first embodiment, repeated description is not necessary.

When a 8-VSB signal is inputted to the data input terminal 1 while "1" is inputted to the filter construction control terminal 122, the selectors 107, 108, and 109 operate in the same manner as described for the case where the VSB signal is inputted to the waveform equalization apparatus of the first embodiment, whereby the TF unit 103a, the TF unit 104a, and the TF unit 405a are connected in series. The TF 401 in the TF unit 401a performs a filtering process on the 8-VSB signal inputted to the data input terminal 1, outputs the filter-processed signal to the adder 411, and outputs a delay signal to the TF 402, and further, outputs the delay signal to the selector 409. The TF 402 in the TF unit 401a performs a filtering process on the delay signal supplied from the TF 401, outputs the filter-processed signal to the adder 411, and outputs a delay signal to the TF 403, and further, outputs the delay signal to the selector 409. The TF 403 in the TF unit 401a performs a filtering process on the delay signal supplied from the TF 403, outputs the filter-processed signal to the adder 411, and outputs a delay signal to the TF 404, and further, outputs the delay signal to the selector 409. The TF 404 performs a filtering process on the delay signal supplied from the TF 403, and outputs the filter-processed signal to the adder 411. The adder 411 sums the filter-processed signals obtained from the respective TFs 401~404, and outputs the sum to the adder 115.

When "0" is inputted to the center tap control terminal 413, the selector 409 selects the delay signal from the TF 401 as a main signal component of the TF unit 401a, and outputs it. Therefore, the selector 409 outputs data which is delayed by 16 symbols with respect to the data inputted from the data input terminal 1, and the center tap of the TF 401a, i.e., the tap for taking the main signal component, becomes the 16th tap. Likewise, when "1" is inputted to the center tap control terminal 413, the selector 409 selects the delay signal of the TF 402 as the main signal of the TF unit 401a and outputs it, whereby the center tap of the TF unit 401*a* becomes the 32nd tap. Further, when "2" is inputted to the center tap control terminal 413, the selector 409 selects the delay signal of the TF 403 as the main signal of the TF unit 401*a*, whereby the center tap of the TF unit 401*a* becomes the 48th tap. In this way, the selector 409 receives the center tap control signal inputted to the center tap control terminal 413, and selects one of the delay signals outputted from the respective TFs 401~403, as the main signal of the TF unit 401*a*, on the basis of the center tap control signal, and outputs the selected signal to the adder 118.

The TF 405 in the TF unit 405*a* performs a filtering process on the delay outplay of the TF 104, which is selected by the selector 109, and outputs the filter-processed signal to the adder 412, and outputs a delay signal thereof to the TF 406. The TF 406 performs a filtering process on the delay signal supplied from the TF 405, and outputs the filter-processed signal to the adder 412, and outputs a delay signal to the TF 407. The TF 407 performs a filtering process on the delay signal supplied from the TF 406, and outputs the filter-processed signal to the adder 412, and outputs a delay signal to the TF 408. The TF 408 performs a filtering process on the delay signal supplied from the TF 407, and outputs the filter-processed signal to the adder 412. The adder 412 sums the filter-processed signals obtained from the respective TFs 405~408, and outputs the sum to the adder 116.

The selector 110, the selector 111, and the selector 112 operate in the same way as described for the case where the VSB signal is inputted to the apparatus of the first embodiment, and a signal obtained by adding the filter-processed outputs from the TF 401, TF 402, TF 403, TF 404, TF 103, TF 104, TF 405, TF 406, TF 407, and TF 408 and the output from the selector 409 which is the main signal component of the TF unit 401*a*, is supplied as the output of the adder 118 to the delay unit 4 and the data output terminal 11. Thereby, the waveform-equalized VSB signal is outputted from the data output terminal 11.

Figure 6:
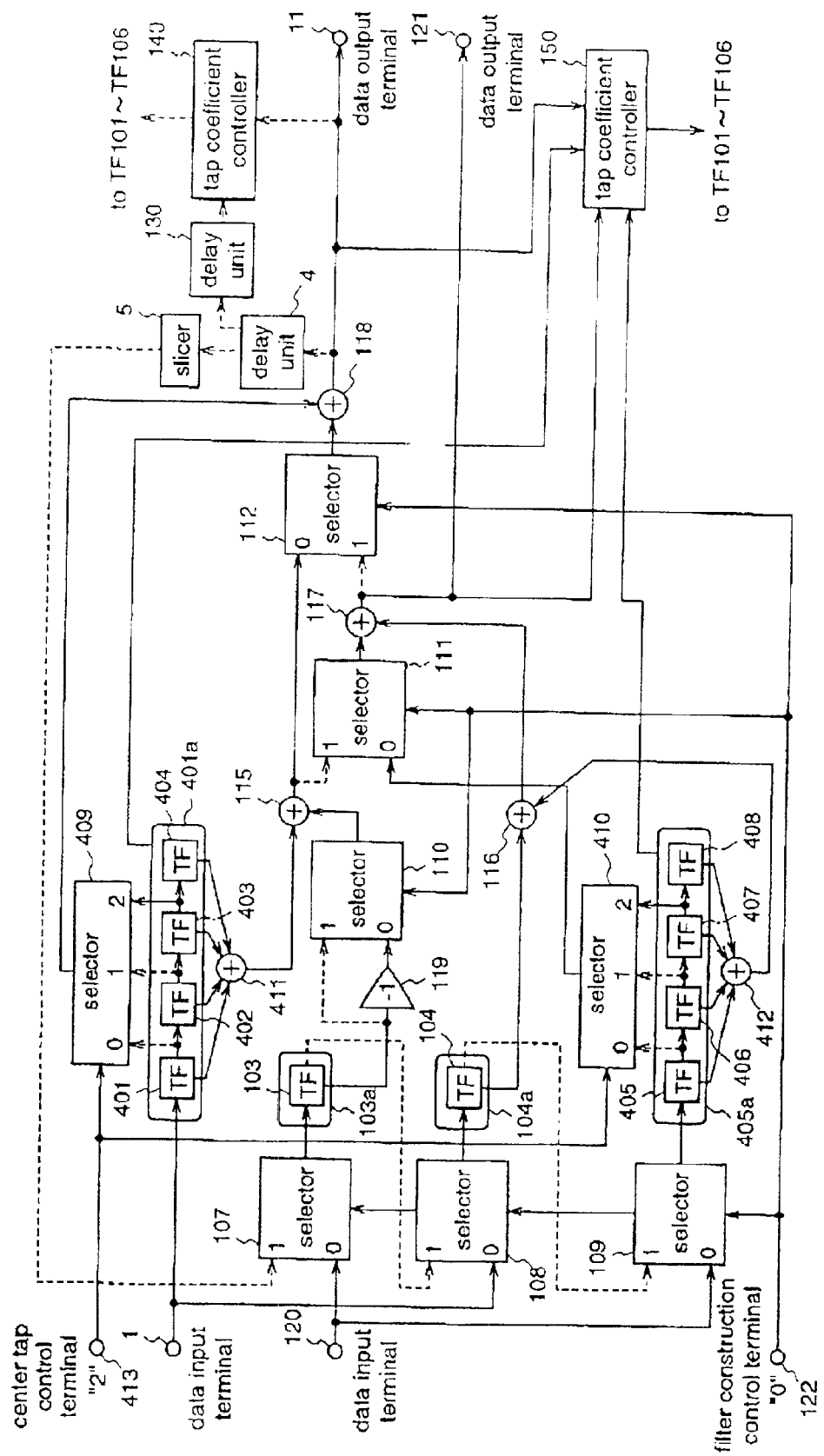
FIG. 6 is a diagram for explaining the operation of the waveform equalization apparatus according to the second embodiment in the case where a QAM signal is inputted to the apparatus.

FIG. 6 is a block diagram for explaining the operation of the waveform equalization apparatus according to the second embodiment in the case where a QAM signal is inputted to the apparatus. The waveform equalization apparatus shown in FIG. 6 is identical to that shown in FIG. 4 except that unused signal lines are shown by dotted lines. Hereinafter, the operation of the waveform equalization apparatus in the case where a 64-QAM signal is inputted to the apparatus will be described with reference to FIG. 6. With respect to the same constituents as first embodiment, the operations thereof will not be described repeatedly.

Initially, a real component of a 64-QAM signal is inputted to the data input terminal 1 while an imaginary component thereof is inputted to the data input terminal 120, and "0" is inputted to the filter construction control terminal 122. As in the above-described case for processing the VSB signal, the TF unit 401*a* outputs the results of filtering processes performed in the respective TFs 401~404 to the adder 411, and outputs delay outputs of the respective TFs 401~403 to the selector 409. The adder 411 sums the filter-processed signals obtained from the respective TFs 401~404, and outputs the sum to the adder 115. Like the TF unit 401*a*, the TF unit 405*a* outputs the results of filtering processes performed by the respective TFs 405~408 to the adder 412, and outputs delay outputs of the respective TFs 405~407 to the selector 410. The adder 412 sums the filter-processed signals obtained by the respective TFs 405~408, and outputs the sum to the adder 116.

At this time, as in the case where the VSB signal is inputted, the selector 409 selects one of the delay signals outputted from the TFs 401~403, as a main signal component of the TF unit 401*a*, on the basis of the center tap control signal inputted to the center tap control terminal 413, and outputs the selected delay signal to the adder 118.

Further, like the above-described selector 409, the selector 410 selects one of the delay signals outputted from the TFs 405~407, as a main signal component of the TF unit 405*a*, on the basis of the center tap control signal inputted to the center tap control terminal 413, and outputs the selected delay signal to the selector 111.

For example, when the center tap control signal is "2", the selector 409 selects the delay signal from the TF 403 and outputs it, thereby outputting data which is delayed by 48 with respect to the data inputted from the data input terminal 1. At the same time, the selector 410 selects the delay output of the TF 407 and outputs it, thereby outputting data which is delayed by 48 with respect to the data inputted from the data input terminal 120. Therefore, the center tap positions of the real component and the imaginary component become the 48th tap. Likewise, when "0" is inputted to the center tap control terminal 413, the center tap position becomes the 16th tap, and when "1" is inputted to the center tap control terminal 413, the center tap position becomes the 32nd tap. In this way, the center tap positions of the TF unit 401*a* and the TF unit 405*a* are controlled by the center tap control signal.

The selector 107, the selector 108, and the selector 109 operate in the same manner as described for the case where a QAM signal is inputted to the waveform equalization apparatus of the first embodiment shown in FIG. 3, whereby the TF unit 401*a*, the TF unit 103*a*, the TF unit 104*a*, and the TF unit 405*a* are connected as a complex filter. Further, the selector 110 and the selector 112 also operate in the same manner as described for the case where a QAM signal is inputted to the waveform equalization apparatus of the first embodiment shown in FIG. 3, and the selector 111 selects the output of the selector 410 and supplies it to the adder 117. Thereby, a signal, which is obtained by adding the signal obtained by the filtering processes in the TF unit 401*a* and the TF unit 103*a*, and the output of the selector 409, i.e., the main signal part of the real component of the QAM signal, is supplied to the data output terminal 11 as the output of the adder 118. Further, a signal, which is obtained by adding the signals obtained by the filtering processes in the TF unit 401*a* and the TF unit 405*a*, and the output of the selector 410, i.e., the main signal part of the imaginary component of the QAM signal, is supplied to the data output terminal 121 as the output of the adder 117. Thereby, the real component of the waveform-equalized QAM signal is outputted from the data output terminal 11, and the imaginary component of the waveform-equalized QAM signal is outputted from the data output terminal 121.

As described above, according to the second embodiment of the present invention, the center tap control signal designating the center tap position is inputted to the center tap control terminal 413, whereby the center tap position can be varied easily, and the range of equalization can be varied, thereby providing a waveform equalization apparatus which enables an optimum tap arrangement according to the condition of the input signal, regardless of whether the input signal is a VSB signal or a QAM signal.

While in this second embodiment the selectable center tap positions are the 16th tap, the 32nd tap, and the 48th tap, the center tap positions may be set at other taps than those mentioned above. Further, the number of selectable center taps (center tap positions) is not restricted to three, and at least two center taps may be selected. In this case, delay signals are taken from two or more tap positions, and the selector selects a delay signal from one of these tap positions on the basis of a center tap control signal, whereby the same effects as described for the second embodiment are achieved.

For example, in the waveform equalization apparatus according to the second embodiment, two TF units each having n pieces of TFs (n: integer equal to or larger than 3), which TFs are connected such that the delay output from the m-th TF (1≦m≦n−1: m integer) is inputted to the (m+1)th TF, may be employed instead of the TF 401a and the TF 405a, respectively; two adders for adding the filter-processed outputs from the respective TFs of the respective TF units and outputting the sums to the adder 115 and the adder 116, respectively, may be employed instead of the adder 411 and the adder 412; and two selectors each receiving the delay outputs from the 1st to (n−1)th TFs of each TF unit, and selecting one of the delay outputs on the basis of a center tap control signal may be employed instead of the selector 409 and the selector 410. Also in this case, the center tap position can be varied according to the center tap control signal, whereby the same effects as described for the second embodiment are achieved.

Embodiment 3

Figure 7:
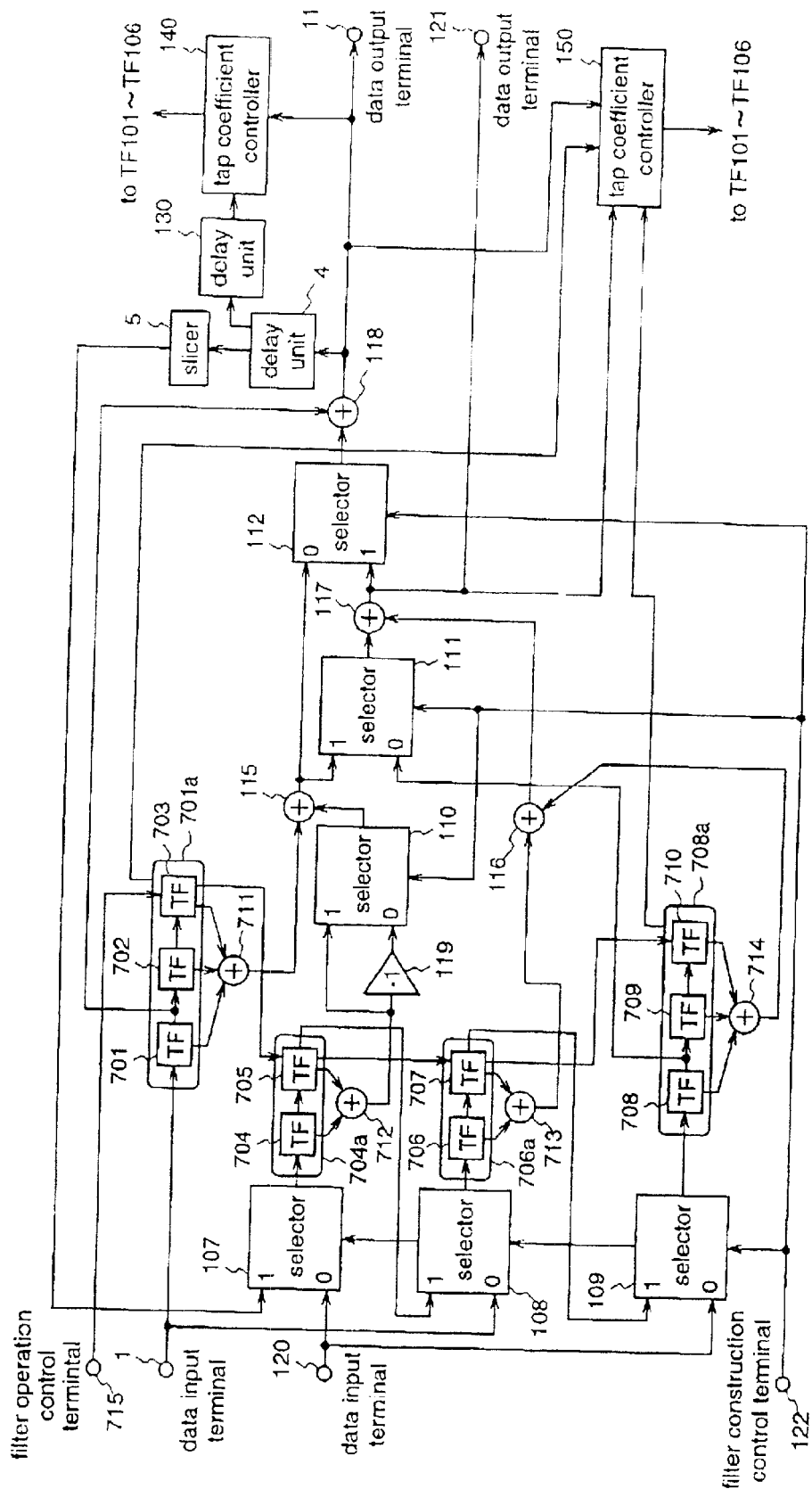
FIG. 7 in a block diagram illustrating a waveform equalization apparatus according to a third embodiment of the present invention.

FIG. 7 is a block diagram illustrating a waveform equalization apparatus according to a third embodiment of the present invention. In FIG. 7, the same reference numerals as those shown in FIG. 1 designate the same or corresponding parts. A TF unit 701a is provided with 16-tap TFs 701 and 702, and a 32-tap TF 703. The TF 701 receives an input signal applied to the data input terminal 1, and outputs a signal which is obtained by performing a filtering process on the input signal, to an adder 711, and further, outputs a delay signal to the TF 702 and the adder 118. The TF 102 receives the delay signal from the TF 701, and outputs a signal obtained by performing a filtering process on the input signal to the adder 711, and outputs a delay signal to the TF 703. The TF 703 receives the delay signal from the TF 702, and outputs a signal obtained by performing a filtering process on the input signal, to the adder 711. Further, an operation control signal is supplied from the outside through a filter operation control terminal 715 to the TF 703, and the operating state of the TF 703 is changed by the operation control signal. The adder 711 sums the results of filtering processes which are outputted from the TFs 701~703, and outputs the sum to the adder 115.

A TF unit 704a is provided with 32-tap TFs 704 and 705. The TF 704 receives the output from the selector 107, and outputs a signal which is obtained by performing a filtering process on the input signal, to an adder 712, and outputs a delay signal which is obtained by delaying the input signal with an internal delay circuit, to the TF 705. The TF 705 receives the delay signal from the TF 704, and outputs a signal obtained by performing a filtering process on the input signal to the adder 712, and outputs a delay signal to the selector 108. The TF 705 is supplied with the operation control signal through the filter operation control terminal 715, and the operating state of the TF 705 is changed according to the operation control signal. The adder 712 sums the results of filtering processes which are outputted from the TF 704 and the TF 705, and outputs the sum to the selector 110 and the code inverter 119.

A TF unit 706a is provided with 32-tap TFs 706 and 707. The TF 706 receives the output from the selector 108, and outputs a signal obtained by performing a filtering process on the input signal, to an adder 713, and outputs a delay signal to the TF 707. The TF 707 receives the delay signal from the TF 706, and outputs a signal obtained by performing a filtering process on the input signal to the adder 713, and outputs a delay signal to the selector 109. The TF 707 is supplied with the operation control signal through the filter operation control terminal 715, and the operating state of the TF 707 is changed according to the operation control signal. The adder 713 sums the results of product-sum operations which are outputted from the TF 706 and the TF 707, and outputs the sum to the adder 116.

A TF unit 708a is provided with 16-tap TFs 708 and 709, and a 32-tap TF 710. The TF 708 receives the output from the selector 109, and outputs a signal obtained by performing a filtering process on the input signal to an adder 714, and outputs a delay signal to the TF 709 and the selector 111. The TF 709 receives the delay signal from the TF 708, and outputs a signal obtained by performing a filtering process on the input signal to the adder 714, and outputs a delay signal to the TF 710. The TF 710 receives the delay signal from the TF 709, and outputs a signal obtained performing a filtering process on the input signal to the adder 714. Further, the TF 710 is supplied with the operation control signal from the outside through the filter operation control terminal 715, and the operating state of the TF 710 is changed by the operation control signal. The adder 714 sums the results of filtering processes which are outputted from the TFs 708~710, and outputs the sum to the adder 116.

The operation control signal to be applied to the filter operation control terminal 715 is previously stored in an external register or the like (not shown), and it is inputted to the filter operation control terminal 715 according to an instruction of an external controller or the like (not shown). In this third embodiment, as the operation control signal, a signal for setting the TFs 703, 705, 707, and 710 in their active states is outputted when performing waveform equalization on the VSB signal, and a signal for setting these TFs in their halt states is outputted when performing waveform equalization on the QAM signal.

In the waveform equalization apparatus according to this third embodiment, the TF units 701a, 704a, 706a, and 708a are employed instead of the TF units employed in the waveform equalization apparatus described for the first embodiment, and when a VSB signal is inputted to the apparatus, "0" is applied to the filter operation control terminal 715 as a signal for setting the TFs 703, 705, 707, and 701 in their active states, whereby each of the TF units 701a, 704a, 706a, and 708a functions as a 64-tap TF, like each TF unit according to the first embodiment. Furthermore, in this third embodiment, the same filter construction control signal as that employed for the first embodiment is applied to the filter construction control terminal 122 when a VSB signal is inputted to the apparatus. Therefore, when performing waveform equalization on the VSB signal in this third embodiment, the same operation as described for the case where waveform equalization is performed on the VSB signal in the waveform equalization apparatus according to the first embodiment, which operation has been described with reference to FIG. 2, is carried out. Accordingly, it is not necessary to repeatedly describe the specific operation of the waveform equalization apparatus of this third embodiment in the case where a VSB signal is inputted to the apparatus.

Figure 8:
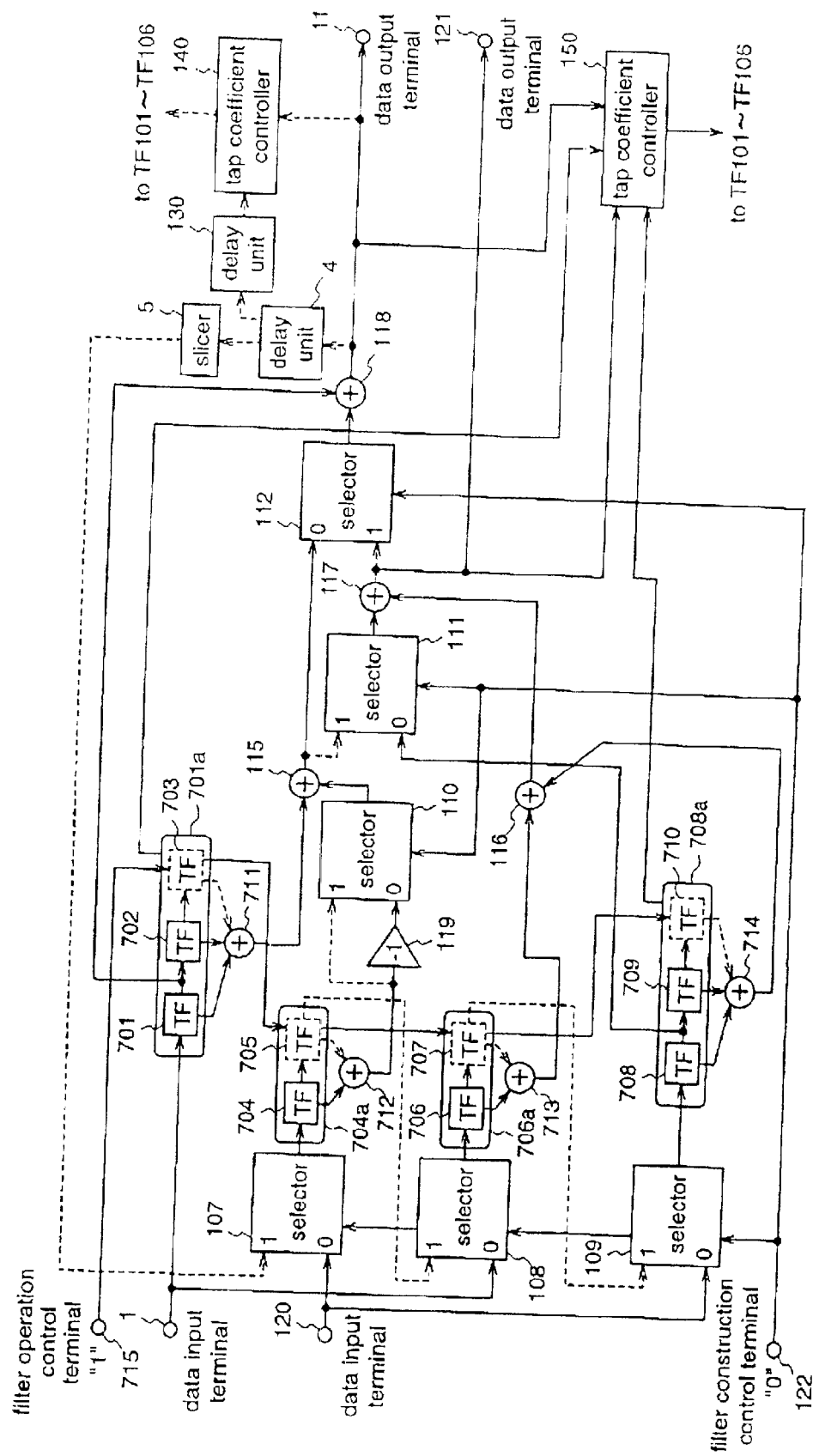
FIG. 8 is a diagram for explaining the operation of the waveform equalization apparatus according to the third embodiment in the case where a QAM signal is inputted to the apparatus.

FIG. 8 is a block diagram for explaining the operation of the waveform equalization apparatus according to the third embodiment in the case where a QAM signal is inputted to the apparatus. The waveform equalization apparatus shown in FIG. 8 is identical to that shown in FIG. 7 except that unused signal lines are shown by dotted lines. Hereinafter, the operation of the waveform equalization apparatus of the third embodiment in the case where at 64-QAM signal is inputted, will be described with reference to FIG. 8. With respect to the same constituents as those of the waveform equalization apparatus according to the first embodiment, the operations thereof will not be described repeatedly.

A real component of a 64-QAM signal is inputted to the data input terminal 1 while an imaginary component thereof is inputted to the data input terminal 120, and "0" is inputted to the filter construction control terminal 122. The selectors 107, 108, and 109 operate in the same manner as described for the case where a QAM signal is inputted to the waveform equalization apparatus of the first embodiment shown in FIG. 3, whereby the TF units 701a, 704a, 706a, and 708a are connected as a complex filter. Further, the selectors 110 and 112 also operate in the same manner as described for the case where a QAM signal is inputted to the apparatus of the first embodiment. Further, the selector 111 selects the delay output of the TF 708 and supplies it to the adder 117. Thereby, a signal obtained by adding the signals which are filter-processed by the TF units 701a and 704a and the delay output of the 701 which is the real component of the QAM signals, is outputted from the adder 118 to the data output terminal 11. Further, a signal obtained by adding the signals which are filter-processed by the TF units 706a and 708a and the delay output of the TF 708 which is the main signal part of the imaginary component of the QAM signal, is outputted from the adder 117 to the data output terminal 121.

When processing the QAM signal, in the TF unit 701a, 704a, 706a, and 708a, sufficient filter characteristics can be obtained in many cases even when all of the taps in each TF unit are not used. In this case, for example, "1" is inputted to the filter operation control terminal 715 as a signal for setting the TFs 703, 705, 707, and 710 in their halt states, whereby the TFs 703, 705, 707, and 710 halt the operations, and output "0" as filter-processed signals. Therefore, each of the TF units 701a, 704a, 706a, and 708a functions as a TF having a tap length of 32 taps.

When a tap length longer than 32 taps is required in each of the TF units 701a, 704a, 706a, and 708a for sufficient filter characteristics, the set values in an external register or the like may be changed so that a signal "0" which sets these TF units in their active states is applied to the filter operation control terminal 715.

As described above, according to the third embodiment of the invention, the operating states of the TFs 703, 705, 707, and 710 are changed by changing the input to the filter operation control terminal 715 according to the input signal, whereby the tap length of each TF unit (i.e., the number of taps constituting each TF unit) can be switched between 32 taps and 64 taps. Thereby, the filter characteristics of the waveform equalization process can easily be changed by increasing/decreasing the number of taps in each TF unit according to the input signal, and power consumption of the waveform equalization apparatus can be reduced by avoiding use of unnecessary TFs.

While in this third embodiment the selectable tap length is 32 taps or 64 taps, the tap length is not restricted thereto. Further, while the center tap position is the position of the 16th tap, the center tap position is not restricted thereto.

For example, in this third embodiment, TF units, each having n pieces of TFs (n: integer equal to or larger than 2) which are connected such that a delay output from the m-th TF ($1 \leq m \leq n-1$, m: integer) is inputted to the (m+1)th TF, may be provided instead of the TF 701a and TF 708a; TF units, each having s pieces of TFs (s: integer equal to or larger than 2) which are connected so that a delay output from the t-th TF ($1 \leq t \leq s-1$, m: integer) is inputted to the (t+1)th TF, may be provided instead of the TF 701a and TF 708a; and the operating state of at least one TF among the TFs constituting each TF unit may be switched between the active state and the halt state according to the filter operation control signal. Also in this case, the same effects as mentioned above are achieved.

Furthermore, in this third embodiment, at least one of the TF units 701a, 704a, 706a and 708a may be replaced with a TF unit which is provided with n pieces of TFs (n: integer equal to or larger than 2) which are connected such that a delay output of the m-th TF ($1 \leq m \leq n-1$, m: integer) is inputted to the (m+1)th TF, and the operating state of at least one TF among the TFs in this TF unit may be switched between the active state and the halt state according to the filter operation control signal.

Embodiment 4

Figure 10:
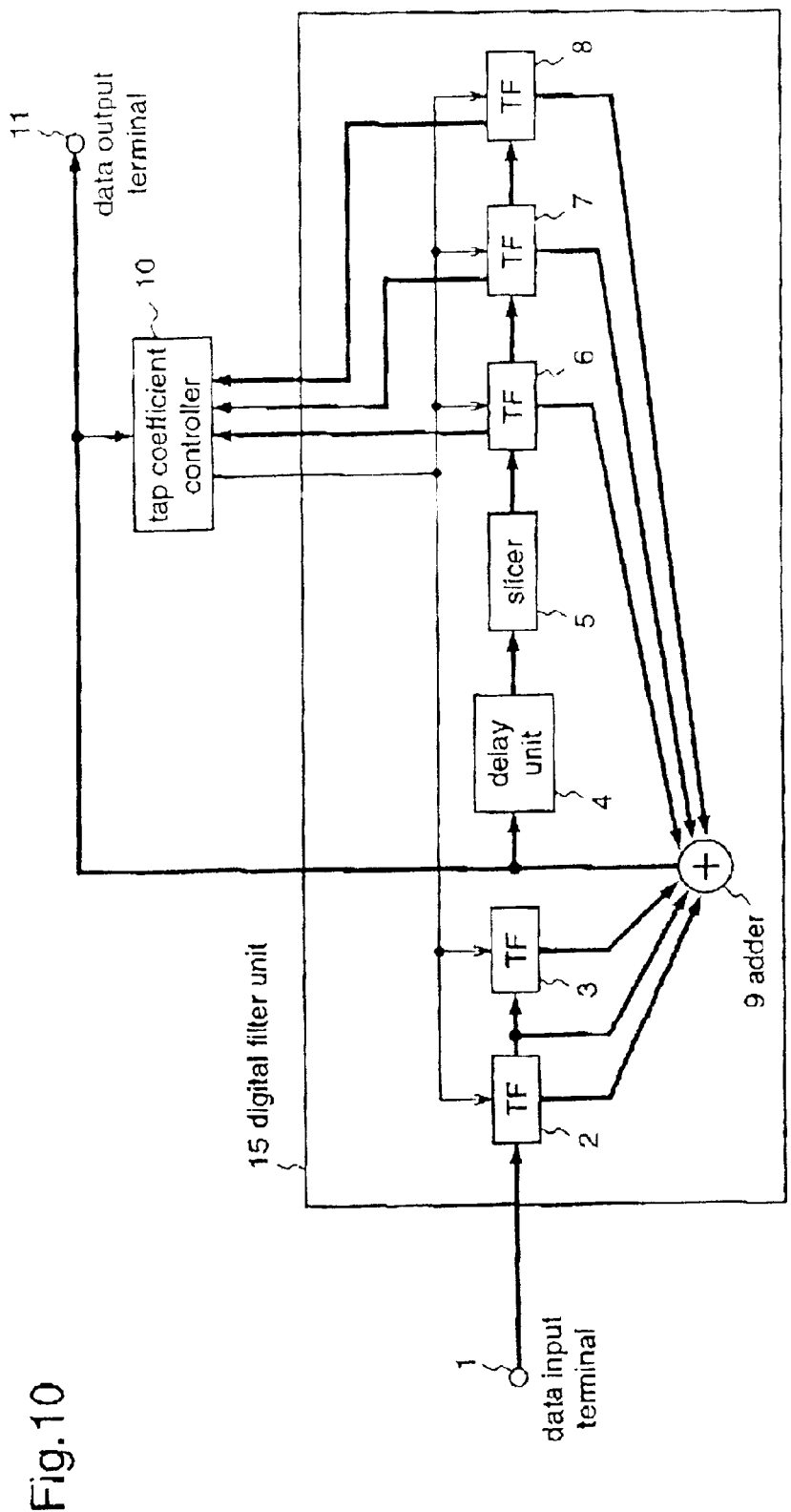
FIG. 10 is a block diagram illustrating a waveform equalization apparatus according to a fourth embodiment of the present invention.
Figure 11:
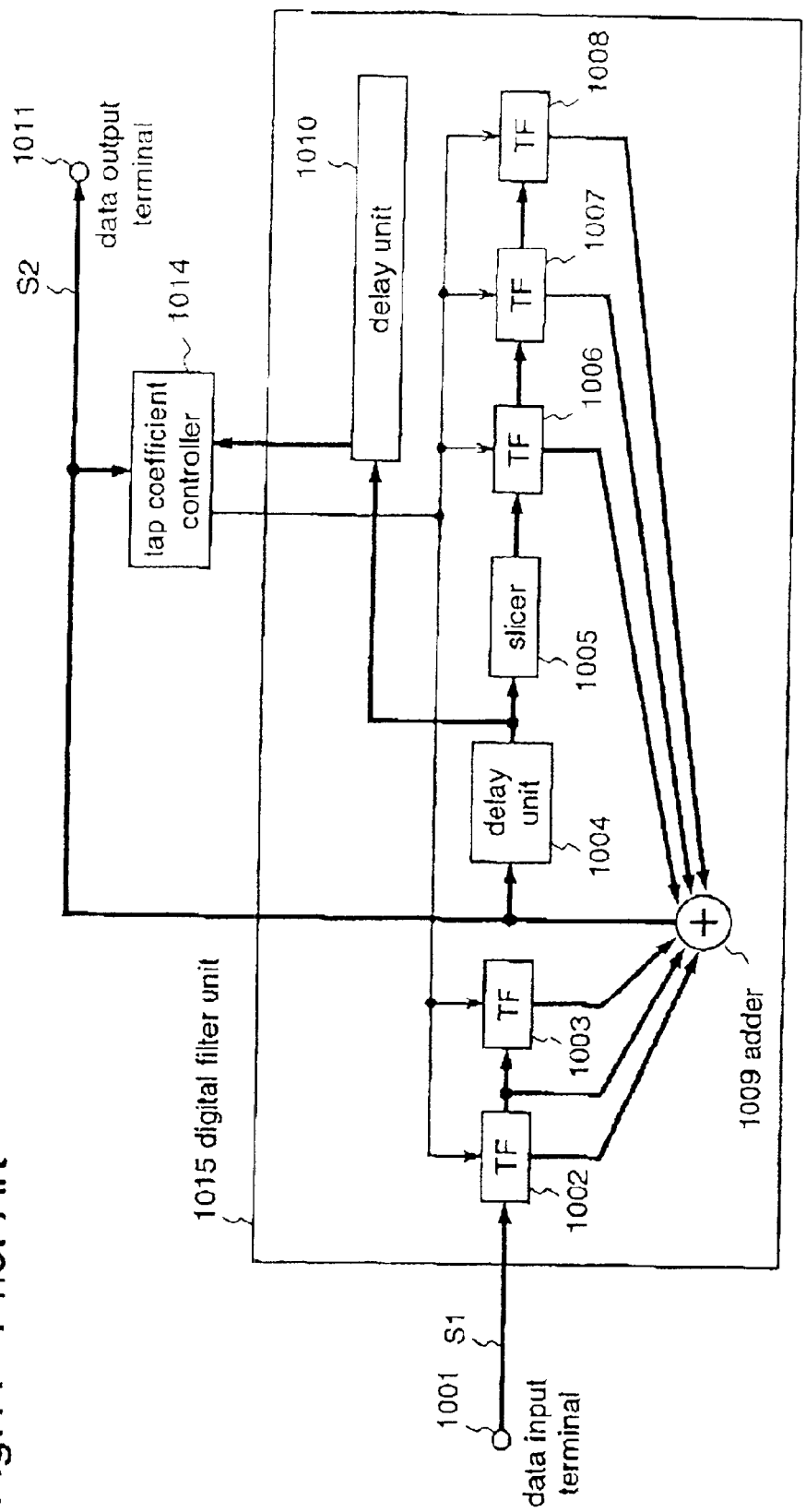
FIG. 11 is a block diagram illustrating an example of a conventional waveform equalization apparatus to be used for waveform equalization of a VSB signal.
Figure 12:
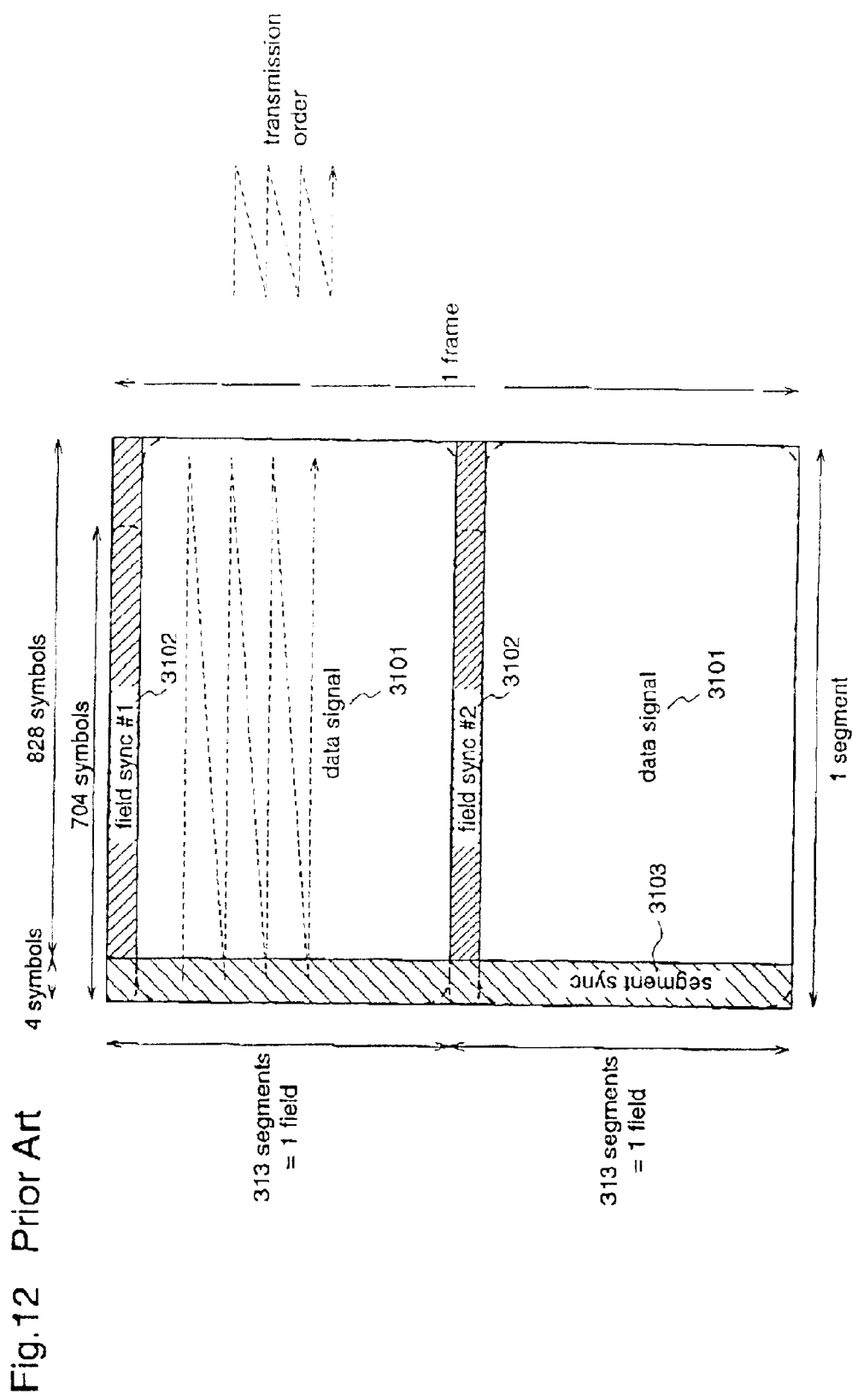
FIG. 12 is a diagram illustrating the construction of a signal format of a VSB signal.
Figure 13:
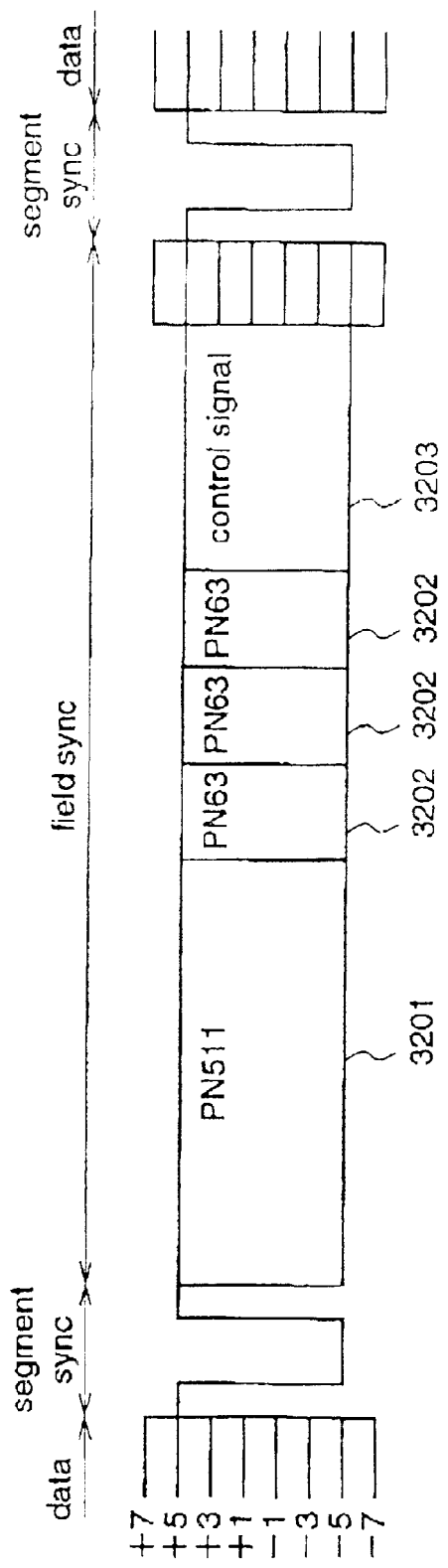
FIG. 13 is a diagram illustrating the construction of a field sync signal included in the VSB signal.
Figure 14:
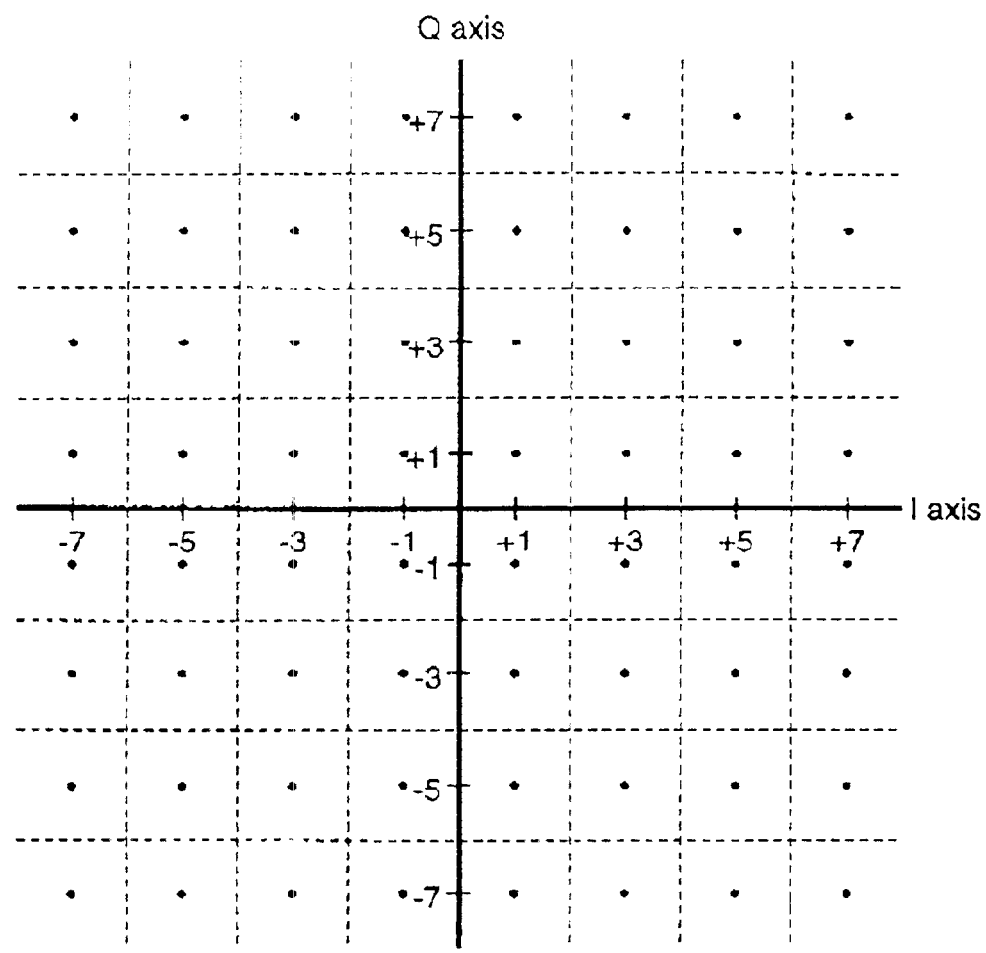
FIG. 14 is a diagram illustrating an arrangement of signal points of a QAM signal.
Figure 15:
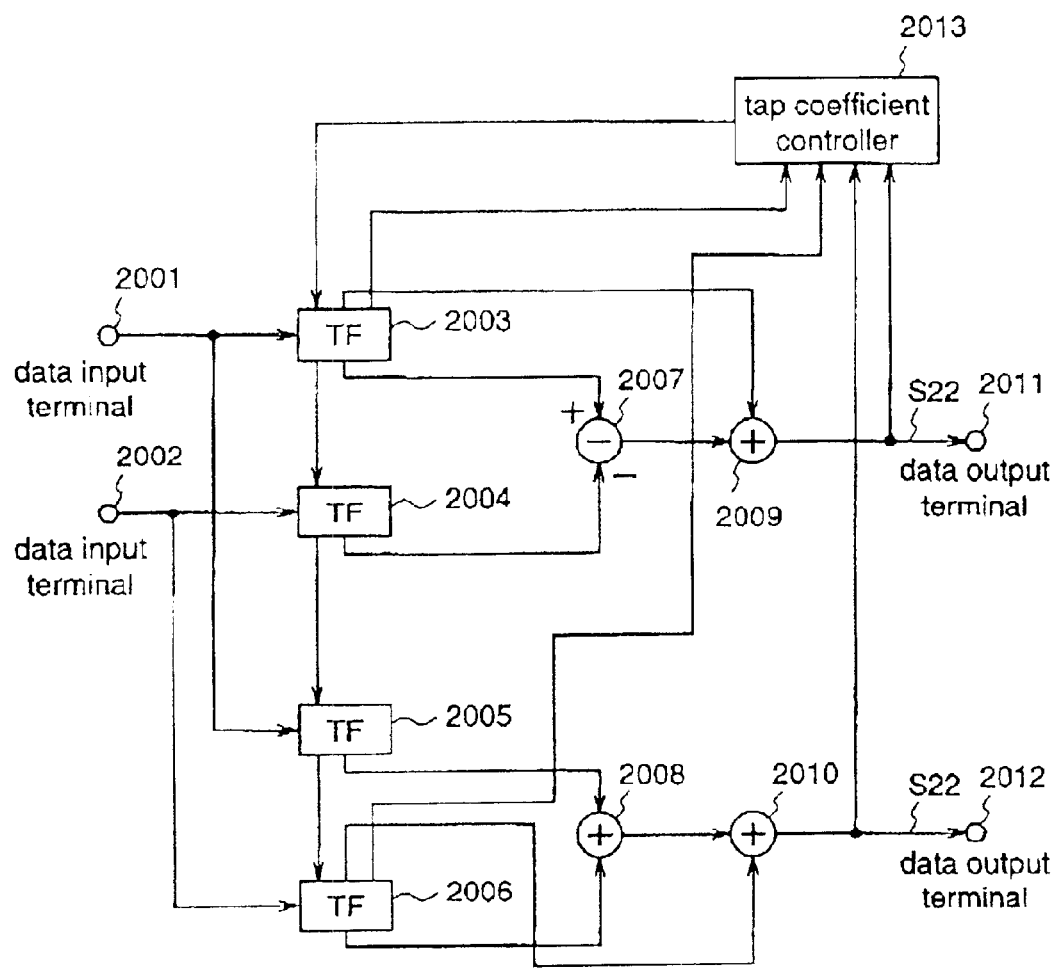
FIG. 15 is a block diagram illustrating an example of a waveform equalization apparatus to be used for waveform equalization of a QAM signal.

FIG. 10 is a block diagram illustrating a waveform equalization apparatus according to a fourth embodiment of the present invention. In FIG. 10, the same reference numerals as those shown in FIG. 1 designate the same or corresponding parts. The waveform equalization apparatus comprises a data input terminal 1 for receiving a VSB signal which is a signal having only a real component; a digital filter unit 15 for performing a waveform equalization process on the data inputted from the data input terminal 1; a data output terminal 11 for outputting the VSB signal which is waveform-equalized by the digital filter unit 15; and a tap coefficient controller 10 for calculating tap coefficients to be used in the digital filter unit 15 on the basis of the data obtained from the digital filter unit 15, and outputting the tap coefficients to the digital filter unit 15.

In the digital filter unit 15, a 32-tap TF 2 receives the signal inputted to the data input terminal 1, performs a product-sum operation on signals obtained from the internal 32 taps and tap coefficients given to the respective taps by the tap coefficient controller 10, and outputs the result of the product-sum operation to an adder 9, as a signal obtained by a filtering process. Further, the 32-tap TF 2 outputs a delay signal which is obtained by delaying the input signal, to a 32-tap TF 3 and the adder 9. The TF 3 receives the delay signal outputted from the TF 2, and outputs a signal obtained by performing a filtering process on the input signal, to the adder 9. The TF 2 and TF 3 are equivalent to a 64 tap TF, and the delay signal outputted from the TF 2 is inputted to the adder 9, as a signal of the center tap of the 64-tap TF, i.e., as a main signal component. A delay unit 4 delays the signal outputted from the adder 9 by 32 symbols, and outputs the delayed signal to a slicer 5. The slicer 5 maps the output signal from the delay unit 4 to a closest value among the eight values, and outputs the mapped signal, thereby removing an influence of noise of the input signal on the subsequent processes.

A 64-tap TF 6 receives the signal outputted from the slicer 5, and outputs a signal obtained by performing a filtering process on the input signal to the adder 9, and outputs a delay signal to a 64-tap TF 7. The TF 7 receives the delay signal outputted from the TF 6, and outputs a signal obtained by performing a filtering process on the input signal to the adder 9, and outputs a delay signal to a 64-tap TF 8. The 64-tap TF 8 receives the delay signal outputted from the TF 7, and outputs a signal obtained by performing filtering process on the input signal, to the adder 9. In this fourth embodiment, the three TFs 6, 7, and 8 connected in series are used as a 192-tap TF. Further, signals obtained from the respective taps included in the TFs 6, 7, and 8 are outputted to the tap coefficient controller 10. The adder 9 sums the results of the product-sum operations obtained from the TFs 2, 3, 6, 7, and 8, and outputs a signal obtained by the summing, from the data output terminal 11, as a waveform-equalized VSB signal and, further, outputs the signal to the tap coefficient controller 10 did the delay unit 4. The tap coefficient controller 10 calculates tap coefficients corresponding to the respective taps in the TFs 2, 3, 6, 7, and 8, on the basis of the output from the adder 9 and the outputs from the respective taps of the TFs 6, 7, and 8, and controls updation of tap coefficients using the calculated tap coefficients.

Next, the operation of the waveform equalization apparatus will be described with reference to FIG. 10. Initially, when a VSB signal is inputted to the data input terminal 1, the input signal is subjected to a filtering process for waveform equalization by the TF 2 and the TF 3 on the basis of the tap coefficients which are set by the tap coefficient controller 10, and the results of product-sum operations performed on the outputs from the internal taps of the TF 2 and the TF 3, and a delay signal obtained by delaying the input signal with the TF 2, are transmitted to the adder 9 as the result of the filtering process. The adder 9 sums the inputted signals, and outputs a signal obtained by the summing, as an output signal from the data output terminal 11, and further, outputs the signal to the tap coefficient controller 10 and the delay unit 4. The delay unit 4 delays the signal supplied from the adder 9 by 32 symbols, and outputs a delay signal so obtained to the slicer 5. The slicer 5 maps the output of the delay unit 4 to a closest value among the eight values the VSB signal can take, thereby removing influence of noise of the signal on the subsequent processes. The TF 6, TF 7, and TF 8 successively perform filtering processes on the output of the slicer 5, and output the results to the adder 9. The tap coefficient controller 10 obtains differences between the outputs from the respective taps in the TFs 6, 7, and 8 and a most reliable symbol value among the eight symbol values the VSB signal can take, and a difference between the output from the adder 9 and the most reliable symbol value, and updates the tap coefficients of the TFs 3, 6, 7, and 8 using these differences, on the basis of the LMS (Least Mean Square) algorithm.

The tap coefficient controller 10 performs updation of tap coefficients using an algorithm represented by formula (6), as the LMS algorithm for performing the n th updation (n: positive integer) of a tap coefficient Ci of a tap i (i: positive integer) in the TF2 or TF3.

$$Ci(n+1) - Ci(n) - \alpha \times en \times di \quad (6)$$

wherein $\alpha$ indicates a fixed constant step size which determines the coefficient updation amount, en indicates an error in the output signal, di indicates data of the tap i, and $-\alpha \times en \times di$ indicates the coefficient updation amount.

When the tap coefficients of the TFs 6, 7, and 8 are to be obtained, the n-th updation (n: positive integer) of the tap coefficient Ci is carried out according to formula (7) as follows, using data di' which is inputted to the TFs 6, 7, and 8 through the slicer 5 and outputted from each tap of these TFs.

$$Ci(n+1) - Ci(n) - \alpha \times en \times di' \quad (7)$$

wherein $\alpha$ indicates a fixed constant step size which determines the coefficient updation amount, en indicates an error in the output signal, and $-\alpha \times en \times di'$ indicates the coefficient updation amount. In formula (7), di' is an estimated value which is obtained by mapping the data of the above-mentioned di to a most reliable value among the eight values the VSB signal can take, and appropriate coefficient updation is realized by formula (7) using the di'.

In this fourth embodiment, when the tap coefficients of the TFs 6, 7, and 8 are to be obtained, updation of the tap coefficients of the TFs 6, 7, and 8, is carried out on the basis of formula (7) using the data di' which is obtained from the respective taps of the TFs 6, 7, and 8 by inputting the signal that is octal-leveled by the slicer 5 into the TFs 6, 7, and 8 successively. In the conventional technique, the data di, i.e., the output delay data which is not passed through the slicer, is required for obtaining the tap coefficients of the TFs 6, 7, and 8, and therefore, a 192-delay unit is required. In this fourth embodiment, however, such 192-delay unit for holding the output signal for coefficient calculation is not necessary. As a result, the delay unit of a relatively large size can be removed, thereby providing a waveform equalization apparatus with significantly reduced cost.

Embodiment 5

Figure 9:
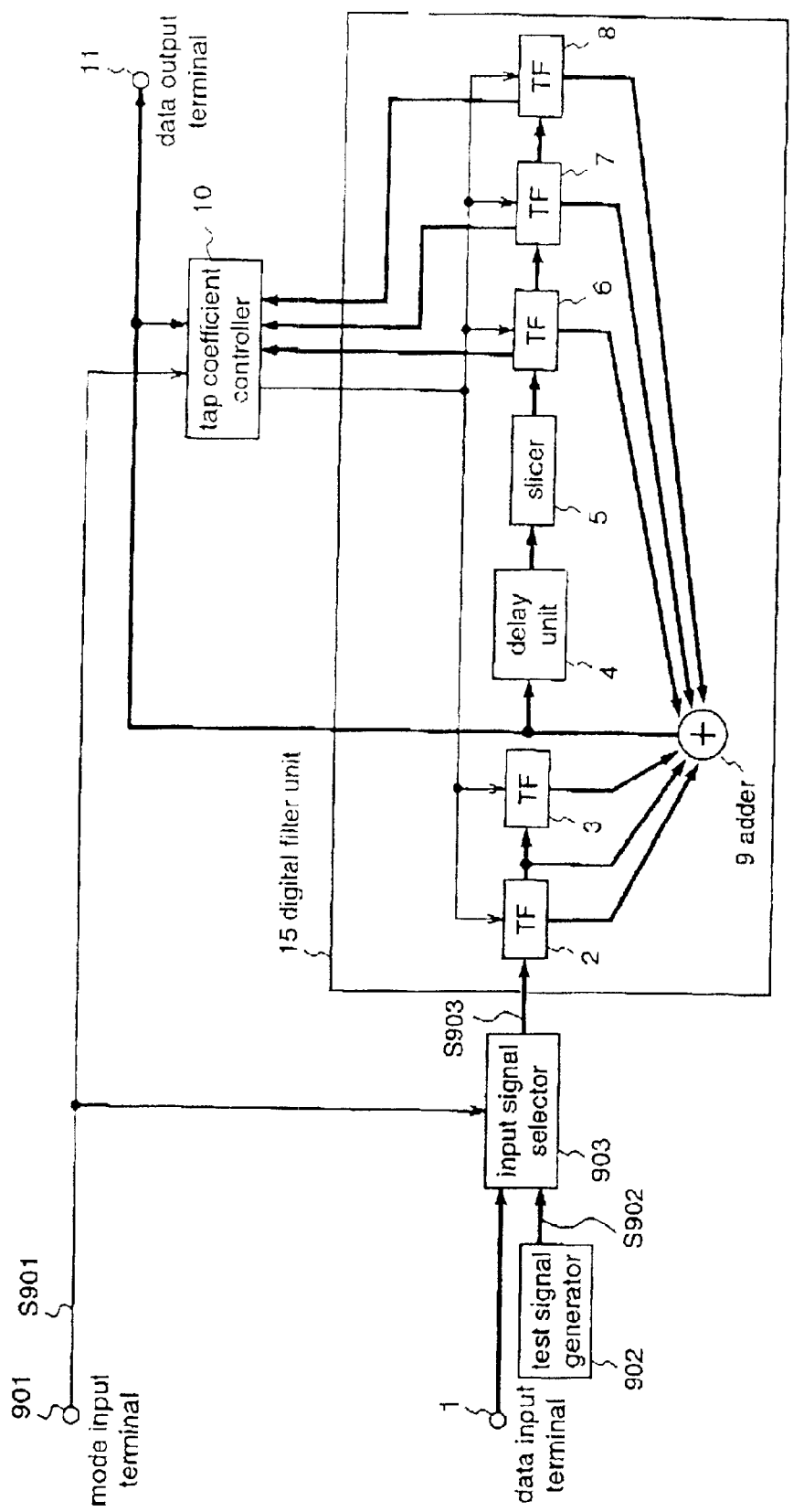
FIG. 9 is a diagram illustrating a waveform equalization apparatus according to a fifth embodiment of the present invention.

FIG. 9 is a block diagram illustrating a waveform equalization apparatus according to a fifth embodiment of the present invention. In FIG. 9, the same reference numerals as those shown in FIG. 10 designate the same or corresponding parts.

With reference to FIG. 9, a mode input signal S901 for determining whether the waveform equalization apparatus is in a normal operation mode or a test mode is supplied from the outside to a mode input terminal 901. This mode input signal S901 is previously stored in an external register or the like (not shown), and it is inputted to the mode input terminal 901 according to an instruction from an external controller or the like (not shown). A test signal generator 902 generates an impulse signal S902 for test, and outputs it to an input signal selector 903. The input signal selector 903, which is disposed between the data input terminal 1 and a digital filter unit 35, selects either the input signal inputted from the data input terminal 1 or the impulse signal S902 generated by the test signal generator 902 on the basis of the value of the mode input signal S901 inputted from the mode input terminal 901, and outputs it as a selected signal S903. A tap coefficient controller 904 performs updation of tap coefficients as described for the third embodiment when it is in the normal operation mode, and halts the updation of tap coefficients when it is in the test mode, on the basis of the mode input signal S901 inputted from the mode input terminal 901.

Next, the operation of the waveform equalization apparatus in the case a VSB signal is inputted to the apparatus, will be described.

Initially, the normal operation mode will be described. When "0" is inputted as the mode input signal S901 to the mode input terminal 901, the input signal selector 903 selects the octal VSB signal inputted to the data input terminal 1, and outputs it as a selected signal S903. The digital filter unit 15 performs a filtering process on the selected signal S903 in the same manner as described for the fourth embodiment. The tap coefficient controller 904 adaptively updates the tap coefficients of the digital filter unit 15 in the same manner as described for the fourth embodiment, on the basis of the output signal from the data output terminal 11 and the outputs of the respective taps in the TFs 6~8.

Next, the case where the normal operation mode is changed to the test mode will be described. When the value of the mode input signal S901 applied to the mode input terminal 901 is changed to "1", the input signal selector 903 selects the impulse signal S902 outputted from the test signal generator 902, and outputs it as a selected signal S903. The digital filter unit 15 performs a filtering process on the selected signal S903 in the same manner as described for the fourth embodiment. The tap to waveform equalization, with the same effects as described above.

What is claim is:

1. A waveform equalization apparatus comprising:
    a first input terminal to which only a real component of a digital input signal to be waveform-equalized is applied;
    a second input terminal to which only an imaginary component of the digital input signal to be waveform-equalized is applied;
    plural transversal filters for performing filtering processes for waveform equalization on the digital input signal;
    a first output terminal from which only a real component of a waveform-equalized digital output signal is outputted;
    a second output terminal from which only an imaginary component of the waveform-equalized digital output signal is outputted;
    plural selectors for selecting a connection of lines which interconnect the first or second input terminal, the plural transversal filters, and the first or second output terminal; and
    a filter construction control signal generator for generating a filter construction control signal which controls the plural selectors to control the filter construction such that the whole apparatus becomes a real component filter when the digital input signal is a signal having only a real component, and becomes a complex filter when the digital input signal is a signal having both a real component and an imaginary component.

2. The waveform equalization apparatus of claim 1, wherein the same number of transversal filters among the plural transversal filters are used when the whole apparatus becomes a real component filter as well as when the whole apparatus becomes a complex filter.

3. The waveform equalization apparatus of claim 1, wherein the signal having only the real component is a VSB signal, and the signal having both of the real component and the imaginary component is a QAM signal.

4. The waveform equalization apparatus of claim 1, wherein a predetermined transversal filter among the plural transversal filters has plural taps; and
    the waveform equalization apparatus further comprising:
        a tap selector for selecting one of the plural taps; and
        a center tap control signal generator for generating a center tap control signal for changing the position of a center tap of the predetermined transversal filter, by controlling the tap selector.

5. The waveform equalization apparatus of claim 1, wherein the tap length of a predetermined transversal filter among the plural transversal filters is changeable according to a filter operation control signal; and
    the waveform equalization apparatus further comprising a filter operation control signal generator for generating a filter operation control signal which changes the filter operation by changing the tap length of the predetermined transversal filter.

6. A waveform equalization apparatus comprising a first input terminal to which a digital input signal having only a real component is inputted; a second input terminal to which a digital input signal having only an imaginary component is inputted; first and second output terminals; first to fourth transversal filter (hereinafter referred to as TF) units for performing filtering processes for waveform equalization; a delay means for delaying an input signal to output a delayed signal; and first and second tap coefficient control means for controlling tap coefficients of the first to fourth TF units, wherein
    when a signal is applied to only the first input terminal, the first to fourth TF units are connected as follows:
    the signal applied to the first input terminal is inputted to the first TF unit; a signal which is obtained by delaying a signal outputted from the first output terminal with the delay means is inputted to the second TF unit; a delay output from the second TF unit is inputted to the third TF unit; a delay output from the third TF unit is inputted to the fourth TF unit; and signals which are filter-processed by the second to fourth TF units are added to a signal which is filter-processed by the first TF unit and a main signal component of the first TF unit, and the result of the addition is outputted from the first output terminal; and
    waveform equalization is performed on the input signal to the first input terminal while controlling the tap coefficients of the first to fourth TF units with the first tap coefficient control means on the basis of the output from the first output terminal, and a signal so obtained is outputted from the first output terminal; and
    when signals are applied to both of the first input terminal and the second input terminal, the first to fourth TF units are connected as follows:
    the signal applied to the first input terminal is inputted to the first and third TF units; the signal applied to the second input terminal is inputted to the second and fourth TF units; the main signal component of the first TF unit is added to a value which is obtained by subtracting the signal filter-processed by the second TF unit from the signal filter-processed by the first TF unit, and the result of the addition is outputted from the first data output terminal; and the signal filter-processed by the third TF unit, the signal filter-processed by the fourth TF unit, and the main signal component of the fourth TF unit are added, and the result of the addition is outputted from the second output terminal; and
    the input signals applied to the first and second input terminals are subjected to waveform equalization while controlling the tap coefficients of the first to fourth TF units with the second tap coefficient control means on the basis of the outputs from the first and second output terminals, and the real component of the signal so obtained is outputted from the first output terminal while the imaginary component of the signal so obtained is outputted from the second output terminal.

7. The waveform equalization apparatus of claim 6, wherein
    each of the first and fourth TF units is provided with n pieces of TFs (n: integer equal to or larger than 3), and the respective TFs are connected such that a delay output from the m-th TF ($1 \leq m \leq n-1$, m: integer) is inputted to the (m+1)th TF, and
    said waveform equalization apparatus further including:
        a first selection means for receiving delay outputs from the first to (n−1)th TFs of the first TF unit, respectively, selecting one of the plural delay outputs on the basis of a center tap control signal that is supplied from the outside, and outputting the selected signal as a main signal component of the first TF unit; and a second selection means for receiving delay outputs from the first to (n−1)th TFs of the fourth TF unit, respectively, selecting one of the plural delay outputs on the basis of the center tap control signal, and outputting the selected delay output as a main signal component of the fourth TF unit.

8. The waveform equalization apparatus of claim 6, wherein at least one of the first to fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF, and the operating state of at least one of the TFs is switched between the active state and the halt state by a filter operation control signal that is supplied from the outside.

9. The waveform equalization apparatus of claim 6, wherein each of the first and fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF;

each of the second and third TF units is provided with s pieces of TFs (s: integer equal to or larger than 2), and the respective TFs are connected such that a delay output from the t-th TF ($1 \leq t \leq s-1$, t: integer) is inputted to the (t+1)th TF; and the operating state of at least one TF among the plural TFs constituting each of the first to fourth TF units is switched between the active state and the halt state by a filter operation control signal that is supplied from the outside.

10. A waveform equalization apparatus comprising:

a first input terminal to which a digital input signal having only a real component is applied;

a second input terminal to which a digital input signal having only an imaginary component is applied;

a first TF unit for receiving the input signal applied to the first input terminal, and outputting a signal which is subjected to a filtering process for waveform equalization, and a main signal component in the filtering process;

a first selection circuit having first and second inputs, receiving, as the second input, the input signal applied to the second inputs terminal, and selecting either of the first and second inputs to output the selected input;

a second TF unit for receiving the output of the first selection circuit, and outputting a signal which is subjected to a filtering process for waveform equalization, and a delay signal obtained by delaying the input signal;

a second selector for selecting either the input signal applied to the first input terminal or the delay signal outputted from the second TF unit, and outputting the selected signal;

a third TF unit for receiving the output of the second selection circuit, and outputting a signal which is subjected to a filtering process for waveform equalization, and a delay signal obtained by delaying the input signal;

a third selector for selecting either the input signal applied to the second input terminal or the delay signal outputted from the third TF unit, and outputting the selected signal;

a fourth TF unit for receiving the output of the third selection circuit, and outputting a signal which is subjected to a filtering process for waveform equalization, and a main signal component in the filtering process;

a fourth selector for selecting either the signal obtained by the filtering process in the second TF unit or a signal obtained by inverting the filter-processed signal, and outputting the selected signal;

a fifth selector for selecting either a signal which is obtained by adding the output of the fourth selector and the signal obtained by the filtering process in the first TF unit, or the main signal component outputted from the fourth TF unit, and outputting the selected signal;

a sixth selector for selecting either a signal which is obtained by adding the output of the fourth selector and the signal obtained by the filtering process in the first TF unit, or a signal which is obtained by adding the signal obtained by the filtering process in the third TF unit and the signal obtained by the filtering process in the fourth TF unit, and outputting the selected signal;

a first output terminal for outputting a signal which is obtained by adding the output of the sixth selector and the main signal component of the first TF unit;

a delay unit for delaying a signal which is obtained by adding the output of the sixth selector and the main signal component of the first TF unit, and outputting the delayed signal so that it becomes a first input to the first selector;

a second output terminal for outputting a signal which is obtained by adding the output of the fifth selector, the signal obtained by the filtering process in the third TF unit, and the signal obtained by the filtering process in the fourth TF unit;

a first tap coefficient control means for controlling the tap coefficients of the first to fourth TF units, on the basis of a signal which is obtained by adding the output of the sixth selector and the main signal component of the first TF unit; and a second tap coefficient control means for controlling the tap coefficients of the first to fourth TF units, on the basis of the signal which is obtained by adding the output of the sixth selector and the main signal component of the first TF unit, as well as the signal which is obtained by adding the output of the fifth selector, the signal obtained by the filtering process in the third TF unit, and the signal obtained by the filtering process in the fourth TF unit;

wherein, when a signal is inputted to only the first input terminal, the first selector selects the input from the delay unit and outputs it; the second selector selects the delay signal from the second TF unit and outputs it; the third selector selects the delay signal from the third TF unit and outputs it; the fourth selector selects the signal which is obtained by the filtering process in the second TF unit; and outputs it; the fifth selector selects the signal which is obtained by adding the output of the fourth selector and the signal obtained by the filtering process in the first TF unit; and outputs it; the sixth selector selects the signal which is obtained by adding the output of the fifth selector, the signal obtained by the filtering process in the third TF unit, and the signal obtained by the filtering process in the fourth TF unit, and outputs it; and the first tap coefficient control means control the tap coefficients of the first to fourth TF unit; and when signals are inputted to both of the first input terminal and the second input terminal, the first selector selects the input of the second input terminal and outputs it; the second selector selects the input of the first input terminal and outputs it; the third selector selects the input of the second input terminal and outputs it; the fourth selector selects an inverted signal of the signal which is obtained by the filtering process in the second TF unit, and outputs it; the fifth selector selects the main signal component of the fourth TF unit and outputs it; the sixth selector selects the signal which is obtained by adding the output of the fourth selector and the signal obtained by the filtering process in the first TF unit, and output it; and the first tap coefficient control means controls the tap coefficients of the first to fourth TF units.

11. The waveform equalization apparatus of claim 10, wherein each of the first and fourth TF units is provided with n pieces of TFs (n: integer equal to or larger than 3), and the respective TFs are connected such that a delay output from the m-th TF ($1 \leq m \leq n-1$, m: integer) is inputted to the (m+1)th TF, and a signal which is obtained by adding the signals that are filter-processed by the respective TFs is outputted as a filter-processed output from each of the first and fourth TF units;

said waveform equalization apparatus further including:

a seventh selection means for receiving delay outputs from the first to (n−1)th TFs of the first TF unit, respectively, selecting one of the plural delay outputs on the basis of a center tap control signal that is supplied from the outside, and outputting the selected signal as a main signal component of the first TF unit; and an eighth selection means for receiving delay outputs from the first to (n−1)th TFs of the fourth TF unit, respectively, selecting one of the plural delay outputs on the basis of the center tap control signal, and outputting the selected signal as a main signal component of the fourth TF unit.

12. The waveform equalization apparatus of claim 10, wherein at least one of the first to fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF, and the operating state of at least one of the TFs is switched between the active state and the halt state by a filter operation control signal that is supplied from the outside.

13. The waveform equalization apparatus of claim 10, wherein each of the first and fourth TF units is provided with n pieces of TFs (n: integer equal to or larger than 2), and the respective TFs are connected such that a delay output from the m-th TF ($1 \leq m \leq n-1$, m: integer) is inputted to the (m+1)th TF;

each of the second and third TF units is provided with s pieces of TFs are (s: integer equal to or larger than 2), and the respective TFs are connected such that a delay output from the t-th TF ($1 \leq t \leq s-1$, t: integer) is inputted to the (t+1)th TF; and the operating state of at least one TF among the plural TFs constituting each of the first to fourth TF units is switched between the active state and the halt state by a filter operation control signal that is supplied from the outside.

14. A waveform equalization apparatus comprising;

an input terminal to which a digital input signal having only a real component is applied;

a first TF for performing a waveform equalization filtering process on the input signal applied to the input terminal;

an adder for receiving, as one of plural inputs, the filter-processed output from the first TF, and adding the inputted signals to output the result of the addition;

an output terminal for outputting the output of the adder;

a delay unit for delaying the output of the adder, and outputting the delayed signal;

a slicer for slicing the output of the delay unit;

a second TF for performing a waveform equalization filtering process on the output of the slicer, inputting the filter-processed signal to the adder, and outputting a delay output obtained by delaying the output of the slicer, and signals obtained from the respective taps;

a third TF for performing a waveform equalization filtering process on the delay output of the second TF, inputting the filter-processed signal to the adder, and outputting a delay output obtained by delaying the delay output of the second TF, and signals obtained from the respective taps;

a fourth TF for performing a waveform equalization filtering process on the delay output of the third TF, inputting the filter-processed signal to the adder, and outputting signals obtained from the respective taps; and a tap coefficient control means for controlling the tap coefficients of the first to fourth TFs on the basis of the output of the adder, and the signals obtained from the respective taps of the second to fourth TFs.

15. A waveform equalization apparatus comprising:

an input terminal to which a digital signal is applied;

a test signal generator for generating a signal for test;

an input signal selection means for selecting either the signal applied to the input terminal or the test signal, on the basis of a mode input signal that is supplied from the outside;

a digital filter unit having at least one TF, and performing a filtering process for waveform equalization on the signal that is selected by the input signal selection means;

an output terminal for outputting the signal that is filter-processed by the digital filter unit; and a tap coefficient control means for updating the tap coefficient of the TF in the digital filter unit on the basic of the signal that is filter-processed by the digital filter unit when the input signal selection means selects the signal applied to the input signal, and performing no updation of the tap coefficient when the input signal selection means selects the test signal.

* * * * *